(12) United States Patent
Ohsono et al.

(10) Patent No.: US 7,372,933 B2
(45) Date of Patent: May 13, 2008

(54) RADIOACTIVE-MATERIAL CONTAINER, METAL GASKET FOR SEALING THE RADIOACTIVE-MATERIAL CONTAINER, AND METHOD OF MANUFACTURING THE METAL GASKET

(75) Inventors: Katsunari Ohsono, Hyogo (JP); Takeshi Yokoyama, Hyogo (JP); Kazuo Asada, Hyogo (JP); Tadashi Kimura, Hyogo (JP); Yasuhiro Sakaguchi, Hyogo (JP); Shinji Ookame, Hyogo (JP); Masaharu Minami, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/886,057

(22) Filed: Jul. 8, 2004

(65) Prior Publication Data

US 2008/0075223 A1 Mar. 27, 2008

(51) Int. Cl.
*G21C 19/00* (2006.01)
(52) U.S. Cl. ............... 376/272; 277/618; 277/626; 277/314
(58) Field of Classification Search ............... 376/272; 277/311, 618, 626, 314
See application file for complete search history.

(56) References Cited

U.S. PATENT DOCUMENTS

| | | | | |
|---|---|---|---|---|
| 3,285,615 A | * | 11/1966 | Trbovich | 277/639 |
| 3,820,799 A | * | 6/1974 | Abbes et al. | 277/647 |
| 3,917,294 A | | 11/1975 | Abbes et al. | |
| 4,114,907 A | | 9/1978 | Abbes et al. | |
| 4,410,186 A | * | 10/1983 | Pierce, Jr. | 277/318 |
| 4,561,662 A | | 12/1985 | De Villepoix et al. | |
| 4,602,888 A | | 7/1986 | Court et al. | |
| 5,022,663 A | * | 6/1991 | Fages et al. | 277/644 |
| 5,058,906 A | * | 10/1991 | Adamek et al. | 277/614 |
| 5,076,594 A | * | 12/1991 | Baugh | 277/615 |
| 5,431,417 A | * | 7/1995 | Dahlgren | 277/614 |
| 5,653,450 A | | 8/1997 | De Villepoix et al. | |
| 5,797,604 A | * | 8/1998 | Inagaki et al. | 277/618 |
| 6,056,291 A | * | 5/2000 | Inagaki et al. | 277/314 |
| 6,098,989 A | | 8/2000 | Caplain et al. | |
| 6,625,247 B1 | * | 9/2003 | Ohsono et al. | 376/272 |

(Continued)

FOREIGN PATENT DOCUMENTS

DE 100 03 908 A1 8/1991

(Continued)

OTHER PUBLICATIONS

Marriam-Webster's Collegiate Dictionary, 10th Edition, p. 514.*

(Continued)

*Primary Examiner*—Ricardo J. Palabrica
(74) *Attorney, Agent, or Firm*—Westerman, Hattori, Daniels & Adrian, LLP.

(57) ABSTRACT

A radioactive-material container includes a container body that shields nuclear radiation, which includes a cavity that stores a basket containing a recycle fuel assembly, a lid that covers the cavity, and a metal gasket that includes a sealing area that makes a physical contact with the container body and the lid. The sealing area has a specific shape that disperses tightening stress acting on the metal gasket for a sealing.

2 Claims, 21 Drawing Sheets

U.S. PATENT DOCUMENTS 6,905,125 B2 * 6/2005 Shibata et al. .............. 277/626
2002/0153669 A1 * 10/2002 Caplain et al. ............. 277/606

FOREIGN PATENT DOCUMENTS

| EP | 0 223 997 A1 | 6/1987 |
|---|---|---|
| GB | 1356727 | 6/1974 |
| GB | 1 539 504 | 1/1979 |
| GB | 2001-738 A | 2/1979 |
| GB | 2 278 163 A | 11/1994 |
| JP | 52-148863 | 12/1977 |
| JP | 60-159472 | 8/1985 |
| JP | 62-108197 | 5/1987 |
| JP | 01-108457 | 7/1989 |
| JP | 01-172682 | 7/1989 |
| JP | 04-129966 | 11/1992 |
| JP | 05-050240 | 7/1993 |
| JP | 04-015099 | 10/1993 |
| JP | 5-75154 | 10/1993 |
| JP | 07-055004 | 3/1995 |
| JP | 09-177977 | 7/1997 |
| JP | 11-351394 | 12/1999 |
| JP | 2001-201594 | 7/2001 |
| JP | 2002-156495 | 5/2002 |
| JP | 2003-277585 | 9/2002 |

OTHER PUBLICATIONS

Merriam-Webster's Collegiate Dictionary, 10th Edition, p. 1174.*
Search Report dated Mar. 3, 2005.
"Development of an Evaluation Method for Long-Term Sealability of the Spent Fuel Storage Cask", Osamu Kato et al., vol. 38, No. 6; Published 1996; pp. 95-101.
Japanese Office Action dated Mar. 6, 2007, Application No. 2002-116863.

* cited by examiner

RADIOACTIVE-MATERIAL CONTAINER, METAL GASKET FOR SEALING THE RADIOACTIVE-MATERIAL CONTAINER, AND METHOD OF MANUFACTURING THE METAL GASKET

BACKGROUND OF THE INVENTION

1) Field of the Invention

The present invention relates to a technology for sealing a radioactive-material container.

2) Description of the Related Art

When a nuclear fuel assembly is at the end of a nuclear fuel cycle, finishes the combustion, and is not useful any longer, the nuclear fuel is called a recycle fuel assembly. The recycle fuel assembly is cooled at a cooling pit of a nuclear power plant for about 10 years because the recycle fuel assembly contains highly radioactive materials such as fission product (FP) and requires thermal cooling. Then, the recycle fuel assembly is contained in a radioactive-material container, conveyed to a reprocessing facility, and stored. Because the radioactive-material container contains highly radioactive materials, the radioactive-material container must be sealed with a strict care while the radioactive-material container is stored for about 40 years to 60 years.

FIG. 20 is a cross section for illustrating a sealing structure of a conventional radioactive-material container. In a conventional radioactive-material container 600, a primary lid 607 and a secondary lid 608 are fixed using bolts 610, 611 on a flange member 606. From a viewpoint of maintaining a sealing function over a long period of time, metal gaskets 618, 619, which have a heat resistance, a corrosion resistance, and a high durability, are used to seal a space between the primary lid 607 and the flange member 606 and a space between the secondary lid 608 and the flange member 606. That is, using the metal gaskets 618, 619, the recycle fuel stored in the radioactive-material container 600 is sealed.

FIGS. 21A, 21B are enlarged views for illustrating the metal gaskets 618, 619 and a sealing part of the radioactive-material container 600. A sealing part between the primary lid 607 and the flange member 606 and a sealing part between the secondary lid 608 and the flange member 606 has the same sealing structure. A metal groove 625 is formed by machining and the metal gaskets 618, 619 with a double-ring structure are used. In the metal gasket 618 or the metal gasket 619, inner covers $622_a$, $622_b$ respectively cover coil springs $621_a$, $621_b$ so as to form two rings, and an outer cover 623 covers the rings. The coil springs 621 and the inner covers 622 are made of Inconel (a registered trademark, a nickel alloy containing 16% chromium and 7% iron), which is corrosion resistant and oxidation resistant at high temperature, and the outer cover 623 is made of aluminum (the reference symbol with a subscript is represented by the reference symbol without the subscript, and the same is applied hereinafter). The metal gasket 618 (619), shown in FIG. 21A, has not been used yet. The metal gasket 618 (619), shown in FIG. 21B, is tightened and transformed by fixing the secondary lid 608, a body 601, and the like, and exerts a sealing function.

The metal gasket 618 (619) is fixed to the gasket groove 625 using a bolt hole arranged in the outer cover 623. As the metal gasket 618 (619), "TRYBACK" from NIPPON VALQUA INDUSTRIES, LTD. or "Helicoflex" from Cefilac in France, which are often used in radioactive-material container for nuclear power, may be used.

A time-and-temperature dependence of both a plastic-deformation ratio and a sealing performance of a metal gasket can be represented by Larson-Miller Parameter (LMP), and the details are disclosed in the documents: KATO, ITO, AND MIEDA, Development of method of verifying the long-term sealing performance of spent fuel storage casks, Journal of the Atomic Energy Society of Japan, 1996, Vol. 38, No. 6, pages 95 to 101. Generally, a long-term sealing performance of a metal gasket is verified by acquiring LMP of sealing-maintenance limit and estimating the limit time at a predetermined temperature.

The radioactive-material container 600, which contains the recycle fuel assembly, is stored in the storage facility for a long time of several decades. At this time, the recycle fuel gives out a decay heat, therefore, the metal gaskets 618, 619 is used in the environment at about 120 degrees at the beginning. Then, the temperature gradually goes down during the storage period of several decades, and at the end of the storage period, the metal gaskets 618, 619 is used in the environment at about 60 degrees. The outer covers 623 of the metal gaskets 618, 619 are made of aluminum, and for aluminum, the temperature range described above is corresponding to a range between a temperature where a high-temperature creep occurs and a temperature where a low-temperature creep occurs. Therefore, even though the metal gaskets 618, 619 have the sufficient sealing performance in the early stage, the stress relaxation is caused by a creep deformation and the sealing performance may go down after the metal gaskets 618, 619 are used in a high-temperature environment for a long time. Moreover, though the metal gaskets 618, 619 can maintain the sealing under the applied stress of a few megapascals (MPa), the outer cover 623 creeps easily when the high stress is applied and the outer cover 623 is stressed strongly. Currently, to maintain a desired sealing performance for several decades, a high material (such as gold and silver), which does not creep easily, is used to the metal gasket, or a metal gasket with a large diameter, which enables maintaining a sealing function even when a creep occurs, is used.

A process of containing the recycle fuel assembly in the radioactive-material container 600 needs to be conducted in a pool. After setting the metal gasket 618 in the radioactive-material container 600 sunk in the pool and lifting up the radioactive-material container 600 from the pool, it is necessary to remove water around the metal gasket 618 by vacuum drying. However, an interspace in the sealing part is small, and in some cases, it takes a long time to completely remove the water inside the metal gasket 618. Japanese Utility Model Laid-Open Publication No. H5-75154 p. 1 FIGS. 1 and 2 discloses a structure that ensures a sealing performance of a metal gasket by forming a cover of solid lubricant between an outer cover and an inner cover. However, such a structure has a problem that, in case the water enters inside the metal gasket accidentally during the process conducted in the pool, it takes a very long time to remove the water completely.

SUMMARY OF THE INVENTION

It is an object of the present invention to solve at least the above problems in the conventional technology.

The radioactive-material container according to one aspect of the present invention includes a container body that shields nuclear radiation, which includes a cavity that stores a basket containing a recycle fuel assembly; a lid that covers the cavity; and a metal gasket that includes a sealing area that makes a physical contact with the container body and the lid. The sealing area has a specific shape that disperses tightening stress acting on the metal gasket for a sealing.

The radioactive-material container according to another aspect of the present invention includes a container body that shields nuclear radiation, which includes a cavity that stores a basket containing a recycle fuel assembly; a lid that covers the cavity; and a metal gasket that maintains a sealing inside the cavity, arranged between the container body and the lid. The metal gasket includes at least one coil spring in circular shape, an inner cover that covers the at least one coil spring, and an outer cover that covers the inner cover.

The metal gasket according to still another aspect of the present invention includes a coil spring in circular shape, an inner cover that covers the coil spring, and an outer cover that covers the inner cover. A hole for draining water is arranged in the inner cover.

The metal gasket according to still another aspect of the present invention includes a coil spring in circular shape, an inner cover that covers the coil spring, and an outer cover that covers the inner cover. A portion of the inner cover on a side of smaller hoop-diameter is exposed along a hoop diameter of the outer cover, and the hole for draining water is arranged in the portion.

The metal gasket according to still another aspect of the present invention includes a first coil spring with a first hoop-diameter and a second coil spring with a second hoop-diameter in circular shape, the first hoop-diameter different from the second hoop-diameter; a first inner cover that covers the first coil spring and a second inner cover that covers the second coil spring; and an outer cover that covers the first inner cover and the second inner cover, linking the first coil spring and the second coil spring to form a double ring. A portion of the inner cover on a side of smaller hoop-diameter is exposed along a hoop diameter of the outer cover, and the hole for draining water is arranged in the portion.

The metal gasket according to still another aspect of the present invention includes a spring that is formed by forming a plate material to be circular and have substantially circular cross-section and overlapping both ends of the plate material, and an outer cover that covers the spring. A hole for draining water is arranged in the spring.

The method of manufacturing a metal gasket according to still another aspect of the present invention includes making a hole for draining water in a plate material, the plate material; forming a coil spring in circular shape; forming an inner cover by winding the plate material around the coil spring; and winding an outer cover around the inner cover.

The method of manufacturing a metal gasket according tot still another aspect of the present invention includes making a hole for draining water in a plate material; forming a coil spring in circular shape; forming an inner cover by winding the plate material around the coil spring; and winding an outer cover around the inner cover in such a manner that the hole for draining water is exposed.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10 is an enlarged view for illustrating micro-convexoconcaves formed in a gasket-groove surface or the like;

DETAILED DESCRIPTION

Exemplary embodiments of a radioactive-material container, a metal gasket for sealing the radioactive-material container, and a method of manufacturing the metal gasket according to the present invention will be explained below in detail with reference to the accompanying diagrams. The present invention is not limited to the following embodiments, and the components of the following embodiments include components that a person skilled in the art assumes easily or substantially same components. An applicable scope of a metal gasket according to the present invention is not especially limited, and, for example, the metal gasket may be applied to a sealing part of a radioactive-material container, and a sealing part of a reactor container. The metal gasket is suited to an application that requires maintaining the sealing performance for decades in the comparatively-high-temperature environment, more especially a radioactive-material container that contains the recycle fuel assembly, is conveyed, and stores the recycle fuel assembly for a long period of time.

Figure 1:
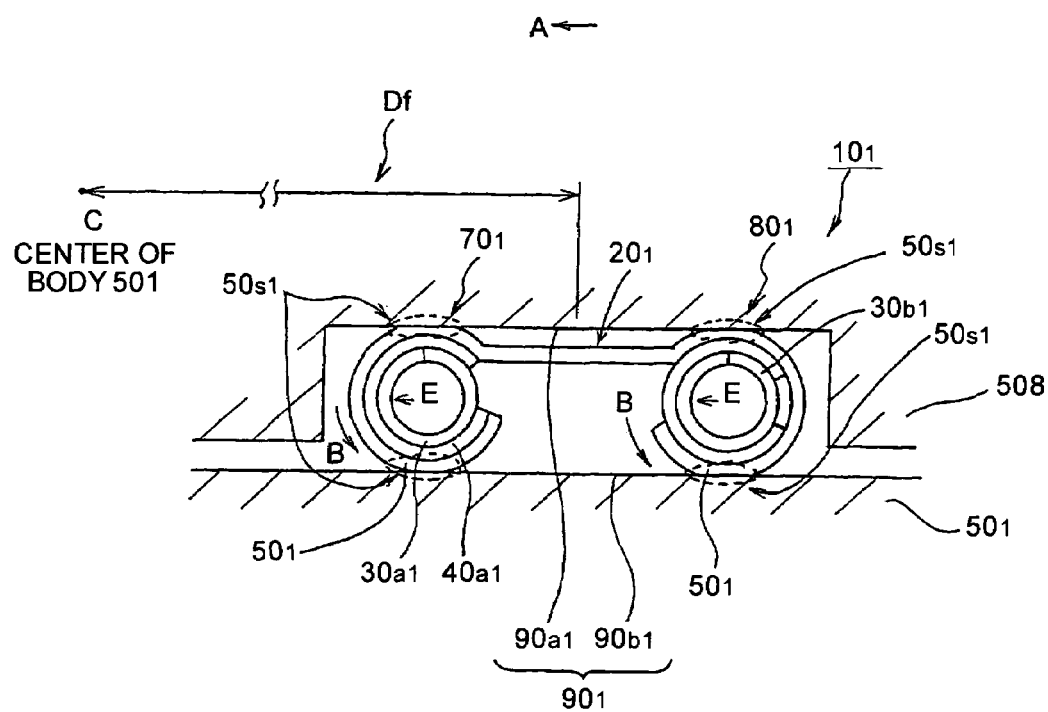
FIG. 1 is a schematic for illustrating a sealing structure of a radioactive-material container according to a first embodiment of the present invention.
Figure 2A:
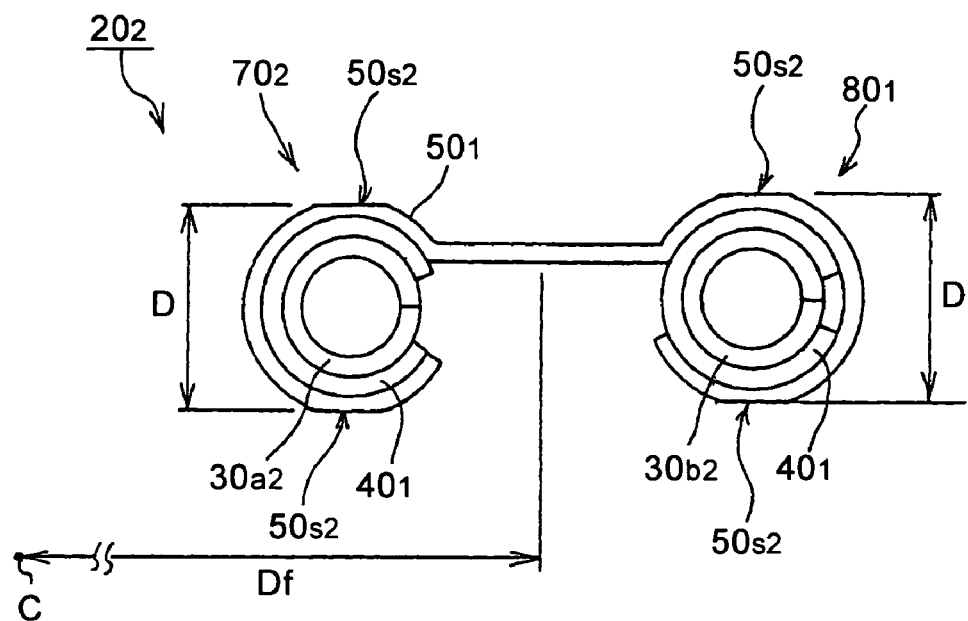
FIGS. 2A and 2B are cross sections of a metal gasket according to the first embodiment of the present invention.
Figure 2B:
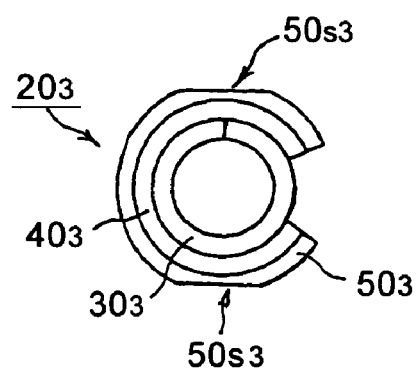

FIG. 1 is a schematic for illustrating a sealing structure 101 of a radioactive-material container according to a first embodiment of the present invention. FIG. 2A is a cross section of a metal gasket 202 according to the first embodiment of the present invention, and FIG. 2B is a cross section of a metal gasket 203 according to the first embodiment of the present invention. The sealing structure 101 is characterized in using a metal gasket 201 with a flat surface for the sealing. The flat surface corresponds to a sealing area $50s1$ of an outer cover 501. The metal gasket 201 is so-called double-ring type, and includes coil springs $30_a1$, $30_b1$, inner covers $40a1$, $40b1$, and an outer cover 501. In the metal gasket 201, the coil springs $30_a1$, $30_b1$ have the different hoop-diameters Df, are arranged concentrically, and covered with the outer cover 501. However, a metal gasket applied to the present invention is not limited to such a double-ring type, but may be applied to the metal gasket $20_3$, which is so called single-ring type. In the metal gasket $20_3$, an inner cover $40_3$ covers a spring coil $30_3$ while an outer cover $50_3$ covers the inner cover $40_3$. The same is applied to the following embodiments, and the inner cover 40 may be removed. Regarding the hoop diameter, the diameter of the circular metal gasket 20, the diameter of the circular coil spring 30, the diameter of the circular inner cover 40, or the diameter of the circular outer cover 50 are called a hoop diameter.

Figure 19:
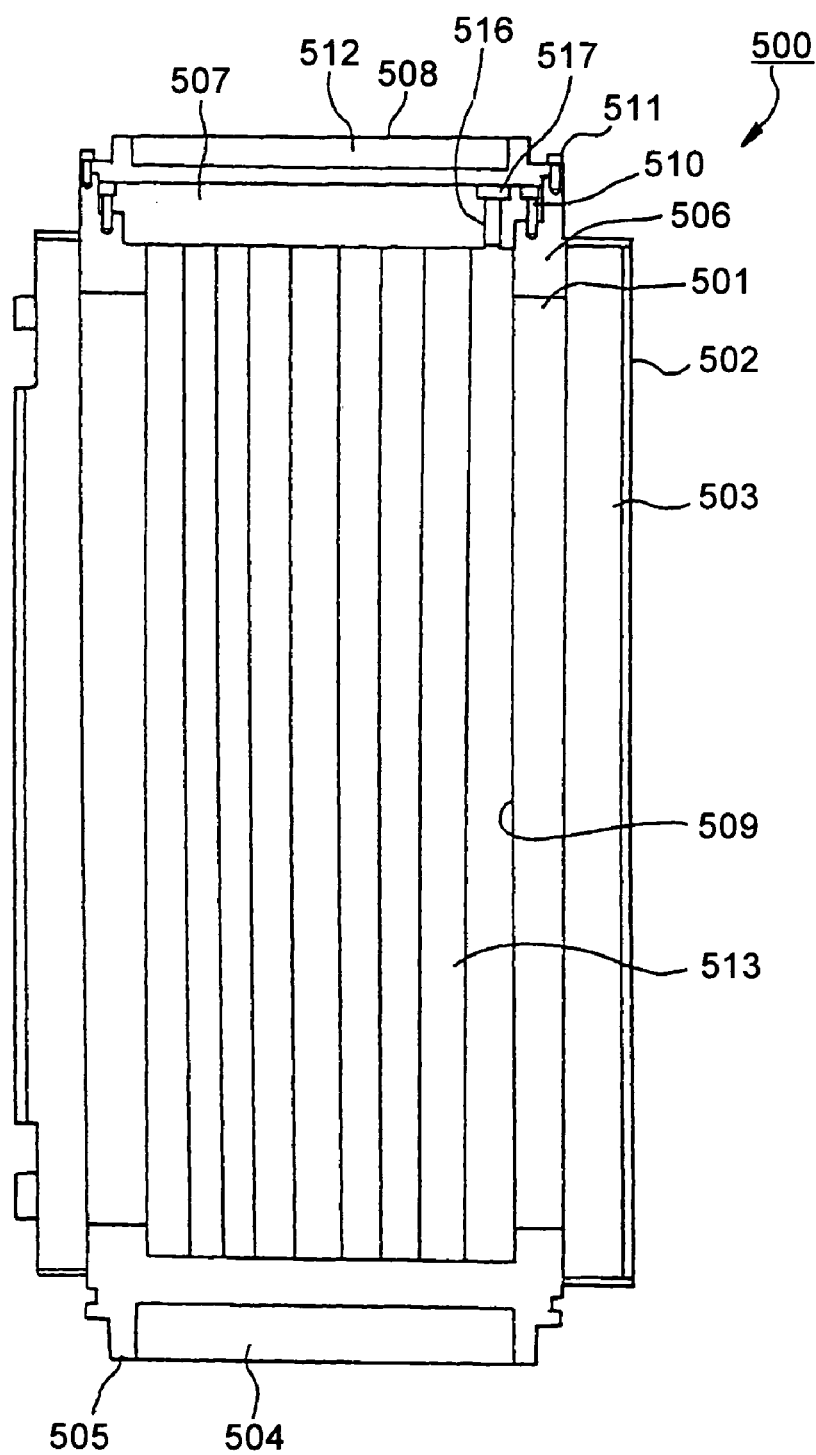
FIG. 19 is a cross section of the radioactive-material container according to the first embodiment of the present invention.

FIG. 19 is a cross section of a radioactive-material container 500 according to the first embodiment of the present invention. The radioactive-material container 500 includes a body 501, which is made of stainless or carbon steel, an external cylinder 502, which composes an external surface of the radioactive-material container 500, a resin 503, which is a polymeric material that contains hydrogen and fills a space between the body 501 and the external cylinder 502, a bottom plate 505, which is welded to the bottom of the body 501 and in which a resin 504 is enclosed, a primary lid 507 and a secondary lid 508, which are arranged on a flange member 506. The flange member 506 is formed so as to unite with the body 501. A basket 513 that contains the recycle fuel assembly is arranged inside a cavity 509 of the body 501. The primary lid 507 and the secondary lid 508 are fixed using bolts 510, 511 on the flange member 506, and a resin 512 is enclosed in the secondary lid 508.

The basket 513 is composed of a plurality of cells formed of boron/aluminum composite. The cavity 509 is filled with negative-pressure helium gas while a space between the primary lid 507 and the secondary lid 508 is positive pressured. Therefore, a pressure barrier is formed between the inside and the outside of the radioactive-material container 500. A hole 514 is arranged in the secondary lid 508 to measure the pressure of a space between the primary lid 507 and the secondary lid 508, and a pressure sensor 515 is arranged on an outlet of the hole 514.

A valve 516 is arranged in the primary lid 507 to replace the gas inside the radioactive-material container 500, and covered with a valve cover 517. To seal a gap between the primary lid 507 and the body 501 or a gap between the secondary lid 508 and the body 501, the metal gasket 20 according to the first embodiment of the present invention is used.

As shown in FIG. 1, the sealing structure 101 is, for example, arranged between the secondary lid 508 and the flange member 506 of the body 501. A sealing structure and a metal gasket according to the present invention may be applied to the space between the primary lid 507 and the flange member 506 of the body 501 (the same is applied hereinafter). In metal gasket 201, the inner cover $40a1$ covers the coil spring $30a1$ so as to form an inner hoop 701, the inner cover $40b1$ covers the coil spring $30b1$ so as to form an outer hoop 801, and the outer cover 501 covers the inner hoop 701 and the outer hoop 801. The metal gasket 201 has the hoop diameter Df of approximately 2 meters (m) (the hoop diameter Df corresponds to a distance from a center C of the body 501 to the metal gasket 201), the inner hoop 701 and the outer hoop 801 have the sectional diameter D of approximately 5.5 millimeters (mm), the outer cover 501 has the thickness of 0.4 mm, and the inner covers $40a1$, $40b1$ have the thickness of 0.2 mm.

As a material of the outer cover 50, a soft metal, such as aluminum, silver, copper, and nickel, is used to ensure the seal performance. As a material of the inner cover 40 and the coil spring 30, a nickel alloy, such as Inconel (a registered trademark), which is corrosion resistant and oxidation resistant at high temperature, is used to maintain elasticity in a high-temperature environment. Nimonic (a registered trademark), which has a high Co content, or the like may be used to improve the durability at higher temperature.

Although the inner covers $40_{a1}$, $40_{b1}$ are used in the metal gasket $20_1$, the inner covers $40_{a1}$, $40_{b1}$ are not always necessary and may be used if needed. It is preferable to arrange the inner covers $40_{a1}$, $40_{b1}$ when the outer cover $50_1$ is made of a soft metal such as aluminum. By arranging the inner covers $40_{a1}$, $40_{b1}$, the repulsive force of the coil springs $30_{a1}$, $30_{b1}$ can be transmitted to the outer cover $50_1$ more uniformly, and the stress-concentration that occurs locally in the outer cover $50_1$ can be decreased as much as possible. Consequently, the creep deformation to be described later can be decreased.

The sealing areas $50s$ are formed on the outer cover 50 to have a flat surface as shown in FIGS. 2A and 2B, and make a contact with the secondary lid 508 and the like to perform the sealing. Such sealing areas $50s$ enable decreasing the tightening-stress relaxation caused by the creep deformation of the outer cover 50, and the details will be described later.

As a material of the secondary lid 508, the primary lid 507, and the body 501, stainless steel or carbon steel is used to block off the radiation and maintain the mechanical strength. On the other hand, as a material of the outer cover 50, a soft metal such as aluminum or silver is used to exert the sealing performance. Therefore, when the secondary lid 508, the primary lid 507, and the body 501 make a contact with the outer cover 50, a contact between the different metals causes a voltage potential difference between the metal gasket 20 and the secondary lid 508 or the like, the galvanic corrosion occurs in the metal gasket 20, and the air tight is broken. To prevent the galvanic corrosion, SUS317 or SUS625, which contains molybdenum, is used as a material of the secondary lid 508 and the body 501.

SUS317 and SUS625 have a good weldability and are generally suited to an application that has a lot of parts to be welded, such as a radioactive-material container. SUS314, SUS316, SUS326, and SUS345 may be used as an alternative to SUS317 and SUS625. Instead of making the secondary lid 508 and the body 501 of SUS317 or the like, a sealing surface 90 may be made on the secondary lid 508 and the body 501 so as to have a bulge portion using the same material.

Another way to prevent the galvanic corrosion of the secondary lid 508 and the body 501, aluminum may be used as a material of the outer cover 50. Aluminum has the higher corrosion potential than SUS317 or SUS 625, which is a material of the secondary lid 508 and the body 501 and contains molybdenum. When the outer cover 50 is made of aluminum, the outer cover 50 is corroded more easily than the secondary lid 508 and the body 501. However the outer cover 50 can be replaced more easily than the secondary lid 508 and the body 501, so that the secondary lid 508 and the body 501 can be protected from the galvanic corrosion.

Figure 3A:
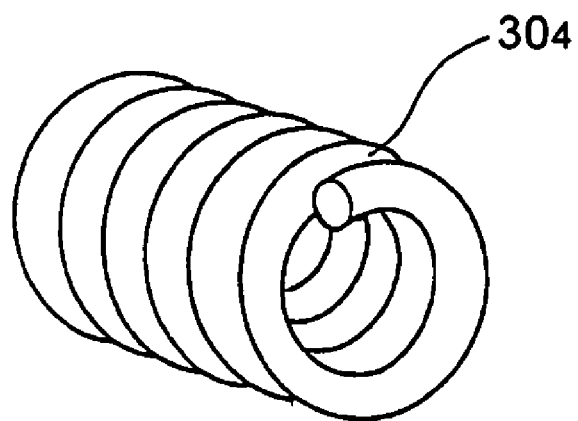
FIGS. 3A and 3B are views for illustrating a coil spring according to the first embodiment of the present invention.
Figure 3B:
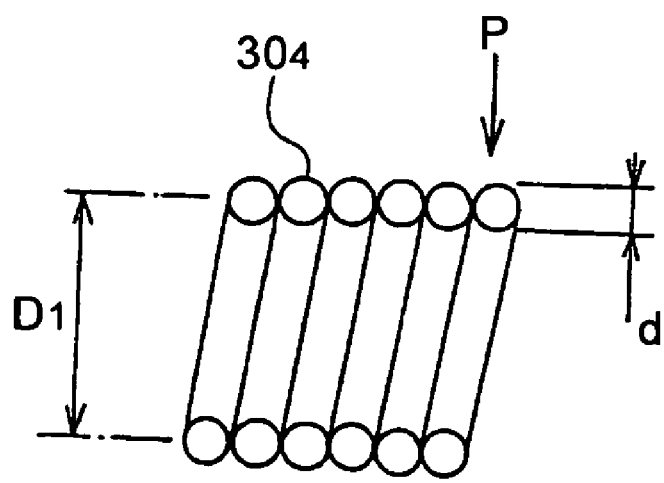

FIGS. 3A and 3B are views for explaining the coil spring 30 of the metal gasket 20 according to the first embodiment of the present invention. A coil spring 304 is formed by closely winding a wire material, which is made of Inconel (a registered trademark), Nimonic (a registered trademark), or the like. If the wire material is not wound closely, when the sealing is performed and the metal gasket 20 is squashed, the coil spring 30 can not push back the inner cover 40 and the outer cover 50 with a uniform force, and the desired sealing-performance can not be exerted in long-time usage (see FIG. 2).

Generally, to gain the seal pressure in the metal gasket 20, the flexural rigidity of the coil spring 30 needs to be increased by using the coil spring 30 with the large wire diameter d. When the wire diameter d of the coil spring 30 gets larger, it gets harder to wind the wire and the winding diameter $D_1$ of the coil spring 30 gets larger. Consequently, the cross-sectional diameter D of the metal gasket 20, which needs to sustain a high seal-pressure, gets larger in comparison with that of a metal gasket that provides to a low seal-pressure. The flexural rigidity of the coil spring 30 indicates how hard to transform the coil spring 30 to the radial direction when force P is acted on the coil spring 30 to the radial direction (the same is applied hereinafter).

The metal gasket 20, which is used in the radioactive-material container, is required to have a sealing performance that can be exerted for several decades. At the beginning, the metal gasket 20 is used in the environment at about 120 degrees, because the recycle fuel assembly contained in the radioactive-material container gives out a decay heat. While the recycle fuel assembly is contained for several decades, the temperature where the metal gasket 20 is used goes down gradually and reaches around 60 degrees finally.

Figure 4:
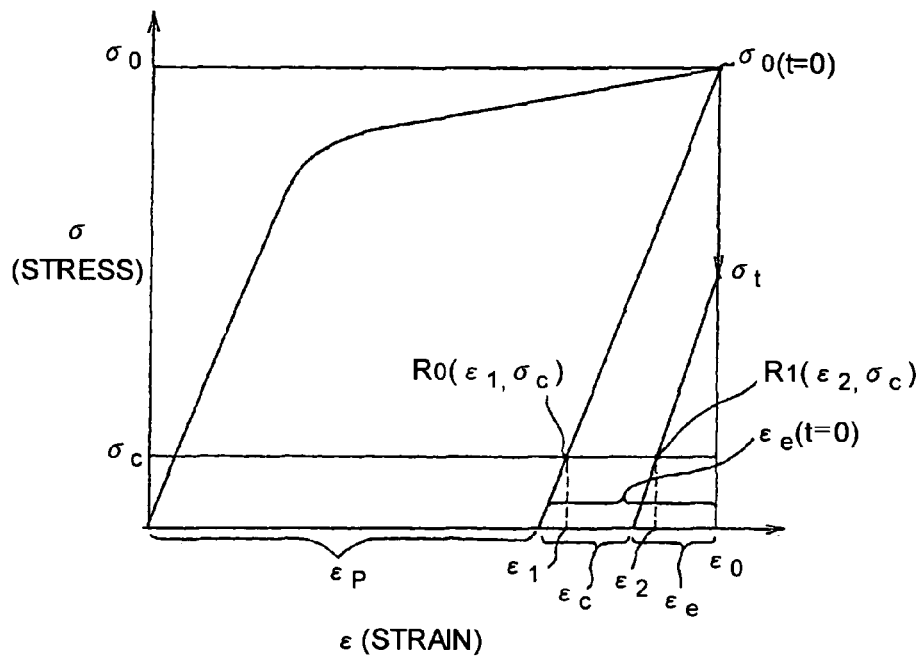
FIG. 4 is a table that shows a relation between a stress that acts on the metal gasket and a strain of the metal gasket.

In such an environment, the outer cover 50 creeps depending on a kind of a material of the outer cover 50. Especially, in case the outer cover 50 is made of the aluminum with a comparatively-low melting point, the creep deformation becomes a problem. The relation between the stress that acts on the metal gasket 20 and the strain of the metal gasket 20 is shown in FIG. 4. When the secondary lid 508 or the like is tightened, a predetermined tightening stress σ0 acts on the metal gasket 20, and an initial strain ε 0 occurs. The initial strain ε 0 corresponds to the sum of a plastic strain ε p and an elastic strain εe(t=0). When a creep strain εc occurs after a certain time, the tightening stress σ0 relaxes and the elastic strain εe thereby decreases. When a certain time t passes after the tightening is performed, the tightening stress σ decreases to the tightening stress at corresponding to the increment of the creep strain εc. This phenomenon is called the stress-relaxation phenomenon of the metal gasket 20.

When the stress that acts on the metal gasket 20 goes below an airtight critical stress σc, shown in FIG. 4, the air tight is broken by the different pressure between the inside and the outside of the radioactive-material container 500. If the tightening stress σ0 is removed just after the tightening stress σ0 acts on the metal gasket 20, the elastic strain εe is removed, and the strain of the metal gasket 20 thereby corresponds to the plastic strain εp. Therefore, the air tight is broken at a point R0. However, if the long time passes after the tightening stress σ0 acts on the metal gasket 20, the tightening stress decreases to the tightening stress at as described above. At this time, if the tightening stress is relieved, the strain of the metal gasket 20 corresponds to the sum of the plastic strain εp and the creep strain εc, and the air tight is broken at a point R1. This is because the initial elastic strain εe (t=0) decreases corresponding to the increment of the creep strain εc.

The airtight critical stress of the metal gasket 20 is represented by σc, therefore, in case it is right after the metal gasket 20 is tightened, the air tight is broken when the strain of the metal gasket 20 decreases to ε1. On the other hand, in case a long time has passed, the air tight is broken when the strain of the metal gasket 20 decreases to ε2. Compared to the former case, the latter case shows that the air tight is broken with less strain, namely with less displacement.

In order to maintain the sealing performance of the radioactive-material container 500 in the long-term storage and improve the reliability, the stress-relaxation phenomenon of the metal gasket 20 needs to be analyzed thoroughly. The present inventors studied on stress-relaxation phenomenon of the metal gasket 20 earnestly, and found the following items. First, the stress-relaxation phenomenon occurs when the elastic displacement of the coil spring 30 is relieved by the creep deformation of the material that composes the outer cover 50. The springback of the metal gasket 20 that deteriorates is determined by the flexural rigidity of the coil spring 30 plastically-deformed. Even after the long-term storage, the flexural rigidity of the coil spring 30 plastically-deformed is small enough to ignore a change of the characteristics in comparison with the flexural rigidity of the coil spring 30 when the metal gasket 20 is new, and can be considered to have no change in comparison with the outer cover 50. In other words, it is not required to consider the deterioration of the coil spring 30's material, such as Inconel and Nimonic, in considering the stress-relaxation phenomenon of the metal gasket 20.

In order to maintain the sealing performance of the radioactive-material container 500 in the long-term storage and improve the reliability, the following tactics are useful. The first tactic is decreasing the creep deformation of the metal gasket 20. If the creep deformation can be decreased, the tightening stress σ0 decreases less after the long time passes. The second tactic is increasing an amount of the springback of the metal gasket 20 as much as possible after the long time passes. If the amount of the springback can be increased, the secondary lid 508 is allowed to have a larger displacement, which is produced till the tightening stress a reaches the airtight critical stress σc. Therefore, the sufficient margin is obtained when the secondary lid 508 or the like is misaligned by the fall or the like.

Figure 5:
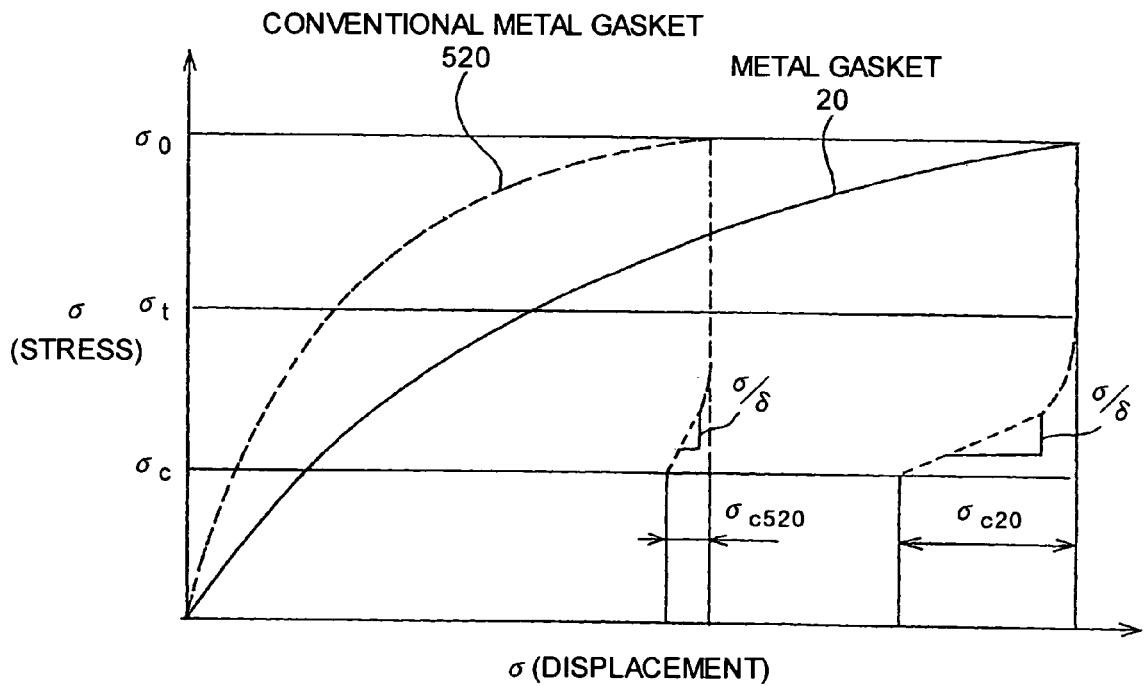
FIG. 5 is a table that shows a relation between a load that acts on the metal gasket and a displacement of the metal gasket.

A method of increasing the amount of springback (hereinafter, the springback amount) will be explained. The relation between a load that acts on the metal gasket and a displacement of the metal gasket is shown in FIG. 5. A dotted line indicates data of a conventional metal gasket 520

(see FIG. 7A), and a solid line indicates data of the metal gasket 20 according to the present invention. An analysis result, shown in FIG. 5, is based on an extrapolation method using LMP, and the temperature conditions are that the initial temperature is 120 degrees and the temperature goes down to 60 degrees for 60 years based on the collinear approximation. The temperature conditions are configured to meet the temperature conditions of the long-term storage in the radioactive-material container that is used actually. The extrapolation method using LMP is preferable in such an analysis, because in the extrapolation method, the stress relaxation is estimated to be on the safe side, namely to be large.

The metal gasket 20 according to the present invention is configured to have a flexural rigidity that corresponds to approximately 50% of the flexural rigidity of the conventional metal gasket 520 by using the coil spring 30 with the wire diameter d thinner than that in the conventional metal gasket 520. The cross-sectional diameter D of the metal gasket 20 is same as that the conventional metal gasket 520. Preferably, the flexural rigidity of the metal gasket 20 is within the range from 30% of the flexural rigidity of the conventional metal gasket 520 to 80% thereof. In such a range, the effect of increasing the springback amount can be acquired while ensuring a certain degree of flexural rigidity. Moreover, the range from 30% of the flexural rigidity of the conventional metal gasket 520 to 60% thereof is more preferable.

The metal gasket 20 according to the present invention is configured to have an initial tightening amount larger than that of the conventional metal gasket 520. Therefore, the initial stress (the tightening stress) $\sigma 0$ acting on the conventional metal gasket 520 and that acting on the metal gasket 20 become equal, and the metal gasket 20 and the conventional metal gasket 520 have the same amount of the stress relaxation when a certain time passes. The tightening stress when a certain time passes is indicated by $\sigma t$. If the tightening stress $\sigma 0$ is gradually relieved when a certain time passes, the metal gasket gradually returns to the original form, and the displacement $\delta$ comes close to zero. The displacement $\delta$ when the tightening stress $\Sigma$ reaches the airtight critical stress $\sigma c$ corresponds to the airtight critical displacement $\delta c$ of the metal gasket.

The metal gasket 20 according to the present invention is configured to have a flexural rigidity smaller than that of the conventional metal gasket 520, therefore, a change $\sigma/\delta$ of the tightening stress $\sigma 0$ to the displacement $\delta$ of the metal gasket is more gradual in the metal gasket 20 than in the conventional metal gasket 520. Consequently, corresponding to the relaxation of the tightening stress $\sigma$, the metal gasket 20 is displaced more largely than conventional. That is, if the tightening stress $\sigma$ acting on the metal gasket 20 is equal to that acting on the conventional metal gasket 520, the metal gasket 20 has the larger springback amount, and thereby has the larger airtight critical displacement $\delta c$. Therefore, even if the larger misalignment occurs in the metal gasket 20 than in the conventional metal gasket 520, the air tight of the radioactive-material container 500 can be maintained. Consequently, the radioactive-material container 500 can be safely transported even after the long-term storage while exerting the stable sealing performance.

Particularly, the springback amount $\delta_{20}$ of the metal gasket 20 according to the present invention is about 0.20 mm while the springback amount $\delta_{520}$ of the conventional metal gasket 520 is about 0.01 mm to 0.02 mm. Like this, the springback amount $\delta_{20}$ is about 10 times to 20 times as large as the springback amount $\delta_{520}$. When the metal gasket is used to seal the radioactive-material container, the metal gasket is required to have the springback amount of about 0.05 mm, and the metal gasket 20 can satisfy this value. Consequently, the metal gasket 20 archives having the sufficient reliability when the radioactive-material container contains the recycle fuel assembly for several decades although the conventional metal gasket 520 fails.

From the above explanation, the decrease of the flexural rigidity of the coil spring 30 increases the springback amount. However, too much decrease of the flexural rigidity increases the deformation amount of the metal gasket 20, and therefore, is not preferable. The evaluation results of the springback amount of the metal gasket after the long-term storage are shown in tables 1 to 3. These evaluations are conducted based on the an extrapolation method using LMP, and the temperature conditions are that the initial temperature is 120 degrees and the temperature goes down to 60 degrees for 60 years based on the collinear approximation. The symbol "○" is shown when the metal gasket has the springback amount required for sealing the radioactive-material container.

TABLE 1 the sectional diameter D of the metal gasket = 5.6 mm

| wire diameter d | 0.30 | 0.35 | 0.40 | 0.50 | 0.53 | 0.55 |
|---|---|---|---|---|---|---|
| evaluation result | Δ | ○ | ○ | ○ | Δ | x |

TABLE 2 the sectional diameter D of the metal gasket = 12.0 mm

| wire diameter d | 0.50 | 0.60 | 0.70 | 0.80 | 0.85 | 0.90 |
|---|---|---|---|---|---|---|
| evaluation result | ○ | ○ | ○ | ○ | Δ | x |

TABLE 3 d/D (d: wire diameter of the metal gasket; D: the sectional diameter of the metal gasket)

| d/D | 0.01 | 0.02 | 0.04 | 0.06 | 0.08 | 0.09 | 0.10 |
|---|---|---|---|---|---|---|---|
| evaluation result | Δ | ○ | ○ | ○ | ○ | Δ | x |

The table 1 shows that, in case the sectional diameter D of the metal gasket 20 is 5.6 mm, the springback amount is favorable when the wire diameter d is between 0.35 mm and 0.50 mm. The table 2 shows that, in case the sectional diameter D of the metal gasket 20 is 12.00 mm, the springback amount is favorable when the wire diameter d is 0.80 mm or less. In the table 3, the ratio d/D of the wire diameter d of the coil spring 30 to the sectional diameter D of the metal gasket 20 is shown by arranging the evaluation results. The table 3 shows that the springback amount is favorable when the ratio d/D is within a range from 0.02 to 0.08.

From the above results, the wire diameter d of the coil spring 30 (see FIGS. 3A and 3B) is preferably within a range from 0.35 mm to 0.80 mm, and more preferably within a range from 0.35 mm to 0.50 mm. When the sectional diameter D of the metal gasket 20 (see FIG. 2) is too small, the springback amount can not be ensured without increasing the tightening amount corresponding to the sectional diameter D. Blindly decreasing the sectional diameter D of the metal gasket 20 may break the air tight conducted by the metal gasket 20, and therefore, is not allowed. On the other hand, when the sectional diameter D of the metal gasket 20 is too large, the required flexural rigidity can not be ensured with the wire diameter d described above. Therefore, the sectional diameter D of the metal gasket 20 is preferably from 5.0 mm to 12.0 mm. The ratio d/D of the wire diameter d of the coil spring 30 to the sectional diameter D of the metal gasket 20 is preferably from 0.02 to 0.08.

In the conventional metal gasket 520, when the conventional metal gasket 520 has the sectional diameter D within a range from 5.0 mm to 6.0 mm, the coil spring with the wire diameter of 0.55 mm or more is used, and the sealing pressure is 50 Mpa or more. In the metal gasket with the sectional diameter D within a range from 5.0 mm to 12.0 mm, if the coil spring with the wire diameter d within a range from 0.35 mm to 0.80 mm is used, the sealing pressure is less than 50 MPa. The sealing pressure in the radioactive-material container is about 1.0 MPa at most. Therefore, in the metal gasket with the sectional diameter D within a range from 5.0 mm to 12.0 mm, if the coil spring with the wire diameter d within a range from 0.35 mm to 0.80 mm is used, the stress produced in the outer cover be decreased without escaping the pressure, and the creep of the outer cover 50 accompanying the long-term usage can be decreased.

Figure 6A:
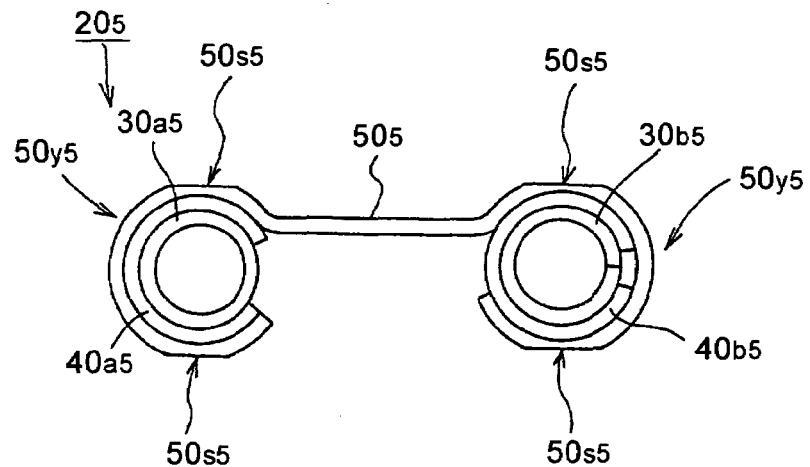
FIGS. 6A to 6C are views for illustrating the metal gasket according to the present invention.
Figure 6B:
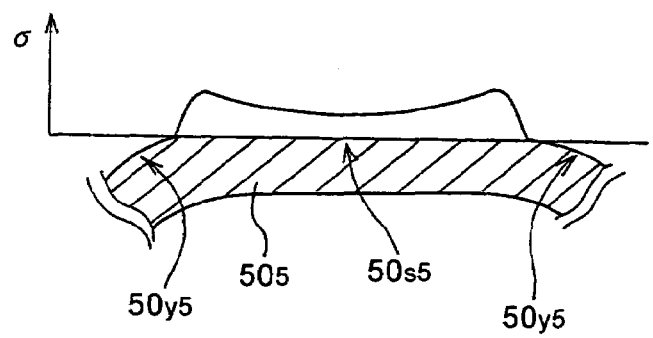
Figure 6C:
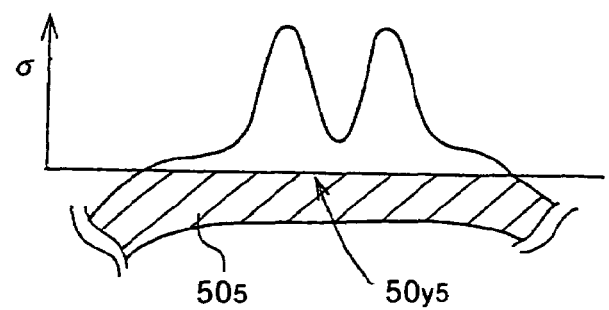
Figure 7A:
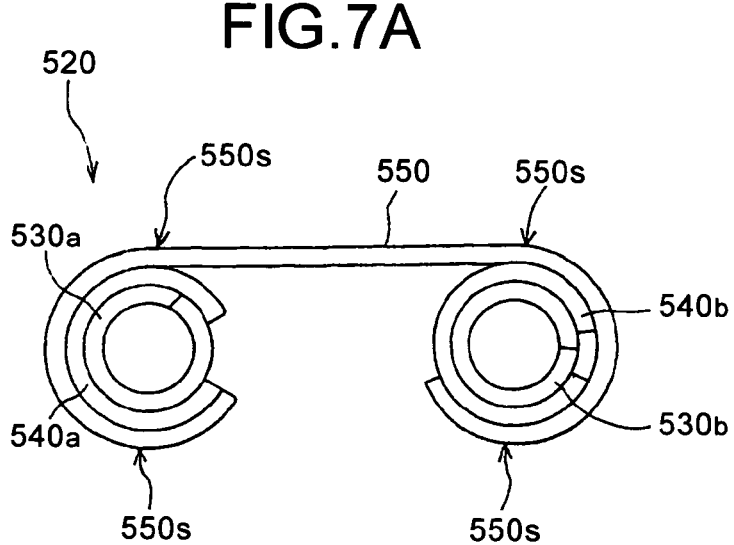
FIGS. 7A to 7C are views for illustrating a conventional metal gasket.
Figure 7B:
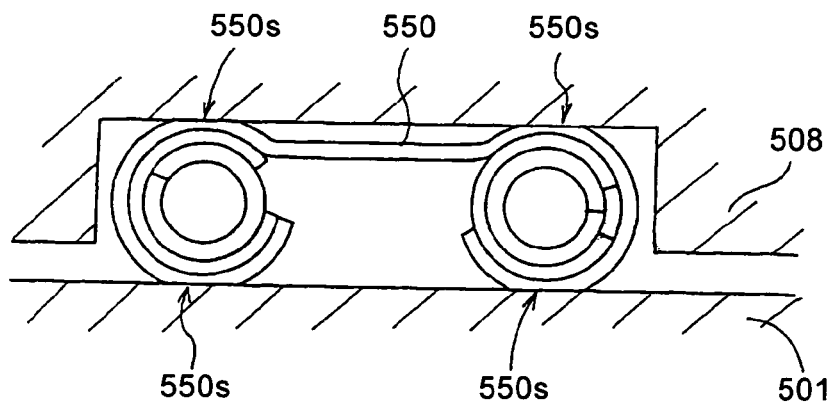
Figure 7C:
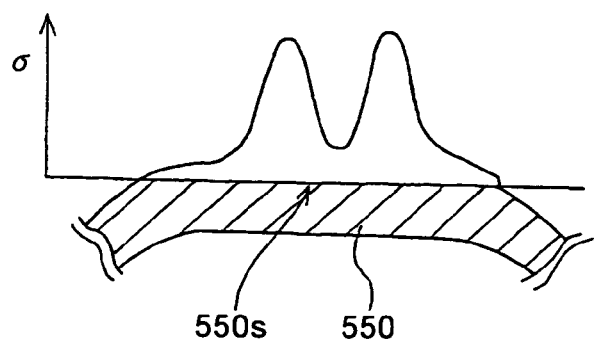

A tactic of decreasing the creep deformation of the metal gasket 20 will be explained. FIGS. 6A to 6C are cross sections for illustrating the metal gasket 20 according to the present invention. FIGS. 7A to 7C are cross sections for illustrating the conventional metal gasket 520. In the conventional metal gasket 520, as shown in FIG. 7B, the cross sections of sealing areas 550s, where an outer cover 550 makes a physical contact with the body 501 or the secondary lid 508, draws an arc, and the sealing areas 550s are deformed by the tightening stress. Consequently, as shown in FIG. 7C, the stress acts on the sealing area 550s nonuniformly. Moreover, the flexural rigidity of a coil spring 530 is large needlessly, therefore, the large stress occurs at the center of the sealing part. Consequently, the action of relaxing the stress distribution is caused and the creep deformation is promoted.

In the metal gasket $20_5$ according to the present invention, as shown in FIG. 6A, a sealing area $50s_5$, where an outer cover 505 makes a physical contact with the secondary lid 508 or the like, is formed to have a flat surface in advance. Consequently, as shown in FIG. 6B, when the metal gasket $20_5$ is compressed by the tightening stress, the stress distribution at the sealing area $50s_5$ is dispersed and become more uniform than conventional. In other word, if the tightening stress acts on an area $50y_5$, which is assumed to be an area except the sealing area $50s_5$, the stress distribution at the sealing area $50s_5$ is more uniform than that at the area $50y_5$.

Compared to the conventional metal gasket 520, the action of uniforming the stress distribution works more at the sealing area $50s_4$, and the creep deformation of the outer cover $50_5$ can be more gradual. Consequently, the creep deformation of the outer cover $50_5$ can be smaller than conventional and the stress-relaxation phenomenon ascribable to the creep deformation can be inhibited. Moreover, the sealing area $50s_5$ is formed to have a flat surface, and such a shape has the lager section modulus in comparison with when the sealing area 550s draws an arc. Moreover, by forming the sealing area $50s_5$ to have a flat surface, the sealing area $50s_5$ of the outer cover 505, which creeps easily, has the thickness thinner than that in the conventional metal gasket 520 (see FIGS. 7A to 7C). Therefore, the absolute amount of the creep deformation is decreased, and the decrease of the recovery amount of the metal gasket $20_5$ is inhibited corresponding to the decrease of the absolute amount of the creep deformation. Owning to these actions, the metal gasket $20_5$ can bear the larger tightening stress that acts in a direction perpendicular to the sealing area $50s_5$ than the conventional metal gasket 520 with a non-flat sealing area 550s. Therefore, in the metal gasket $20_5$, even if coil springs $30_{a5}$, $30_{b5}$ with the thinner wire diameter d are used, the outer cover $50_5$ can support the larger load than conventional. Consequently, the springback amount can be increased, and the higher safety can be obtained even in the long-term storage.

Figure 8A:
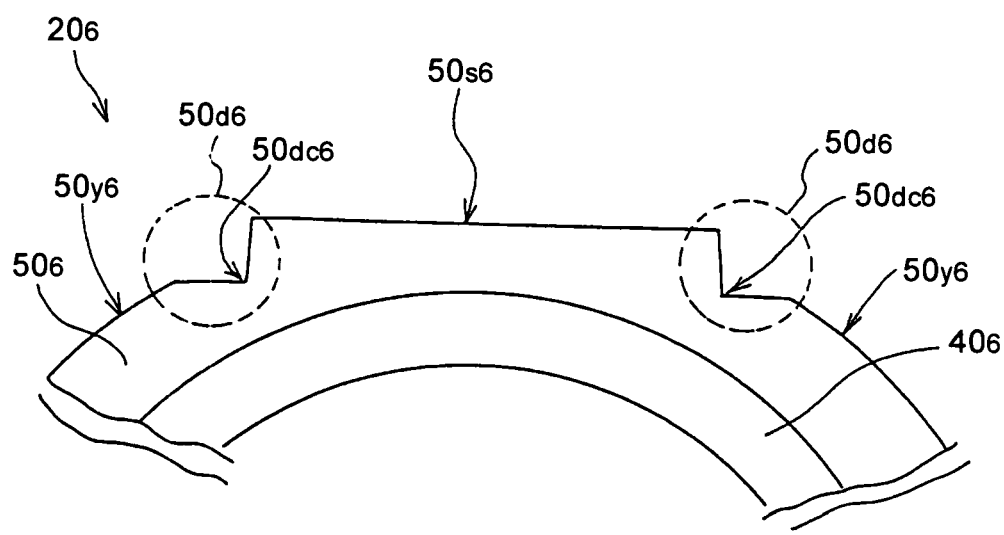
FIGS. 8A and 8B are views for illustrating other shapes to disperse the stress at a sealing area.
Figure 8B:
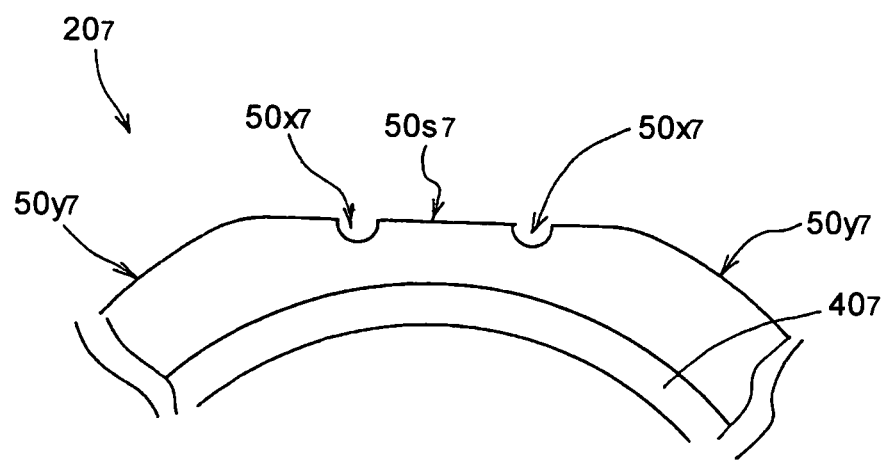

FIGS. 8A and 8B are views for illustrating other shapes to disperse the stress at the sealing area. As described above, in the metal gasket 20 according to the present invention, a sealing area 50s of an outer cover 50 is formed to have a flat surface to disperse the tightening stress for the sealing. To disperse the tightening stress for the sealing, as shown in FIG. 8A, a step $50d_6$ may be formed along the circumferential direction of a metal gasket $20_6$ at an intersection of the flat surface corresponding to the sealing area $50s_6$ and an area $50y_6$.

If the sealing area $50s_5$ is simply formed to have a flat surface as shown in FIG. 6B, the stress concentration occurs at the intersection of the sealing area $50s_5$ and the area $50y_5$. Therefore, a step $50d_6$ is formed at the intersection in advance, by cutting out the intersection, to decrease the stress concentration. Although a corner $50dc_6$ of the step $50d_6$ has an angular shape, the step $50d_6$ may be curved. In this manner, the stress concentration at the corner $50dc_6$ can be decreased.

Even if the sealing area 50s is formed to have a flat surface, some parts are highly stressed depending on a facon. Therefore, at such a part, a groove $50x_7$ may be arranged along the circumferential direction of a metal gasket $20_7$ to decrease the stress concentration. The number and the size of the groove $50x_7$ can be determined properly depending on the occurrence status of the stress concentration. The occurrence status of the stress concentration can be analyzed based on the finite element method or the like. In this manner, the stress concentration that occurs in an outer cover $50_7$ of the metal gasket $20_7$ can be uniformed, therefore, the progress of the creep deformation can be inhibited and the sealing performance can be maintained in the long-term storage.

Figure 9A:
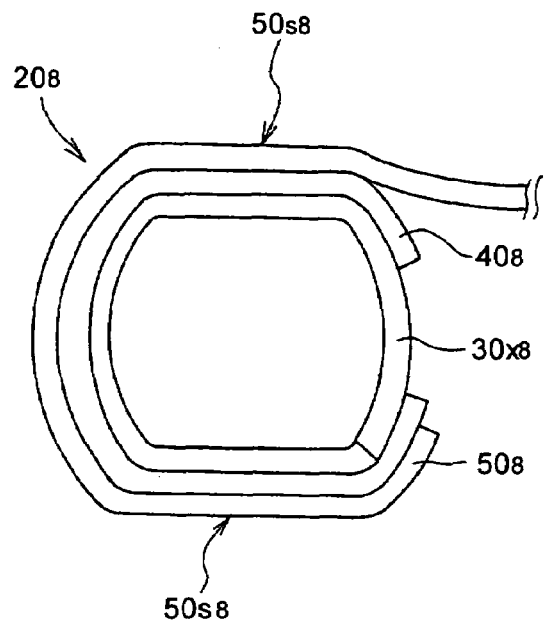
FIGS. 9A and 9B are views for illustrating another example to disperse the stress at the sealing area.
Figure 9B:
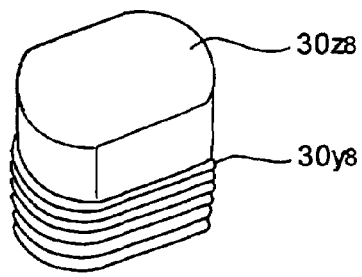

FIGS. 9A and 9B are views for illustrating another example to disperse the stress at the sealing area. As shown in FIG. 9A, a coil spring $30_{x8}$ is formed to have a flat surface on the side of a sealing area $50s_8$, and an outer cover $50_8$ is formed to have a flat surface on the side of the sealing area $50s_8$. In this manner, the coil spring $30_{x8}$ presses the sealing area $50s_8$ of the outer cover $50_8$ uniformly, therefore, the sealing area $50s_8$ has the more uniform stress distribution.

The coil spring $30_{x8}$ may be manufactured as shown in FIG. 9B. The steps are: winding a wire rod $30y_8$ around a jig $30z_8$, doing the annealing so that the wire rod $30y_8$ has the shape of the jig $30z_8$, and manufacturing the coil spring $30_{x8}$ by a heat treatment. The jig $30z_8$ is a pillar that has a substantially elliptical cross-section and two flat surfaces on the side. The coil spring $30_{x8}$ has the smaller flexural rigidity than the coil spring with a circular cross-section. Consequently, the coil spring $30_{x8}$ needs to have the thicker wire diameter than the coil spring $30_4$ with a circular cross-section (see FIGS. 3A and 3B).

Figure 10:
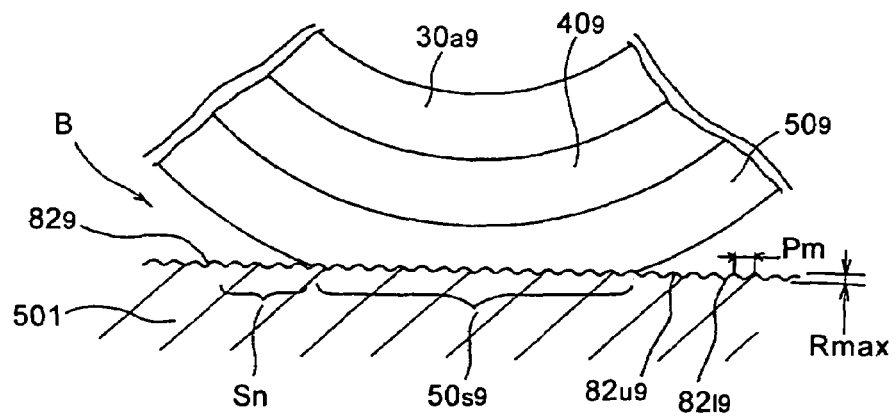

A plurality of micro-convexoconcaves $82_9$ may be formed in a gasket-groove surface $90_{a1}$ and an opposed surface $90_{b1}$, which correspond to sealing surfaces 90, in the present invention as shown in FIG. 10. FIG. 10 is an enlarged view for illustrating the micro-convexoconcaves $82_9$ formed in the gasket-groove surface $90_{a1}$ or the like. The maximum roughness Rmax of the micro-convexoconcave $82_9$ is preferably from 2 μm to 20 μm. If the maximum roughness Rmax is less than 2 μm, a metal gasket $20_9$ slides. If the maximum roughness Rmax is more than 20 μm, an outer cover $50_9$ of the metal gasket $20_9$ does not bite into the micro-convexoconcaves $82_9$ completely and the sealing performance becomes insufficient. The average roughness Ra of the micro-convexoconcave $82_9$ is preferably from 0.6 μm to 3.2 μm.

If the metal gasket $20_9$ is pressed when the micro-convexoconcaves $82_9$ are formed, the micro-convexoconcaves $82_9$ bite into the outer cover $50_9$ (an anchoring behavior) and conform to the surface of the outer cover $50_9$ as shown in FIG. 10. Consequently, the favorable sealing can be obtained (at a sealing area $50s_9$). At a convex part, the surface pressure increases, therefore, the higher sealing performance is obtained.

In case the radioactive-material container 500 falls during the transport and the secondary lid 508 moves radially (namely, to the direction of an arrow A in FIG. 1), the metal gasket $20_9$ does not slide because the outer cover $50_9$ bites into the micro-convexoconcaves $82_9$, and the metal gasket $20_9$ behaves so as to wholly move to the moving direction of the lid (namely, to the direction of an arrow E in FIG. 1) while the outer cover $50_9$ rotates (to the direction of an arrow B) and is deformed. At this time, the outer cover $50_9$ bites into the micro-convexoconcaves $82_9$ that the outer cover $50_9$ has not bitten, and forms a new sealing area Sn.

In this manner, even if the secondary lid 508 moves radially, the metal gasket $20_9$ does not break the sealing, and the sealing performance can be maintained. Therefore, the radioactive-material container 500 can be conveyed without replacing the metal gasket $20_9$ by a rubber O ring. Moreover, when the radioactive-material container 500 is stored for a long time, a plastic flow is caused by the tightening stress that acts on the metal gasket 20, and the decrease of the contact-surface pressure causes the decrease of the sealing performance. However, in this sealing structure, the plastic flow of the surface of the outer cover $50_9$ is inhibited to some degree by forming the micro-convexoconcaves $82_9$, and therefore, the secondary effect of preventing the decrease of the contact-surface pressure can be obtained. When the maximum roughness Rmax of the micro-convexoconcaves $82_9$ is larger, the secondary effect is more effective.

Micro-convexoconcaves 82 may be formed on the sealing surface 90 so that an upper edge $82u_9$ of the micro-convexoconcave $82_9$ appears periodically. The upper edge $82a_9$ and the like may be formed based on a processing method such as a serration method. By using the serration method, the upper edge $82u_9$ is formed independently and the leakage path is not formed, therefore, the sealing performance can be maintained for a long time. Moreover, in case the upper edges $82u_9$ and lower edges $82l_9$ are formed, the values described above can be applied to the maximum roughness Rmax and the average roughness Ra.

Figure 20:
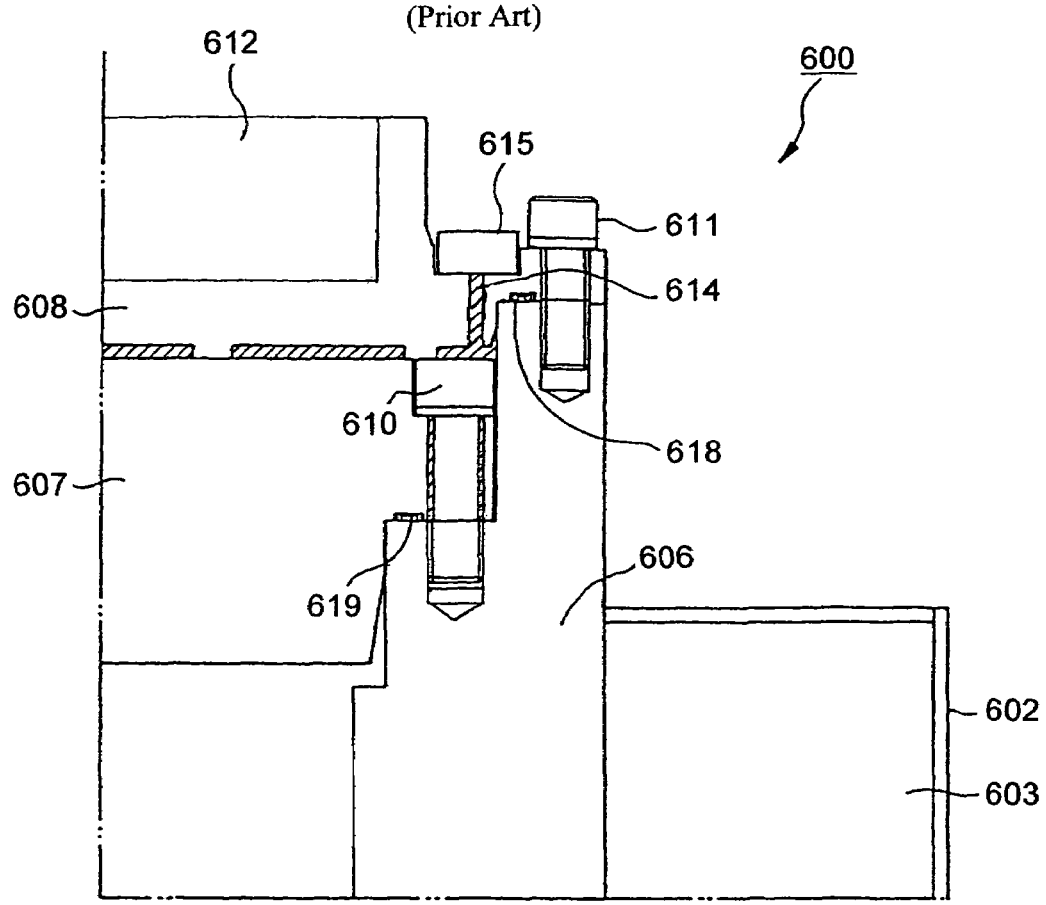
FIG. 20 is a cross section for illustrating a sealing structure of a conventional radioactive-material container.
Figure 21A:
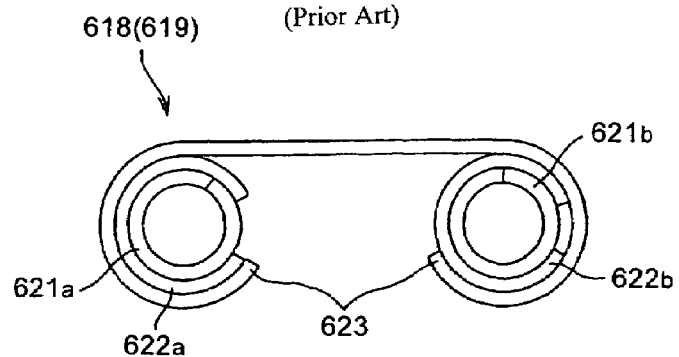
FIGS. 21A and 21B are enlarged views of a metal gasket that is used to seal the conventional radioactive-material container and a sealing part of the conventional radioactive-material container.
Figure 21B:
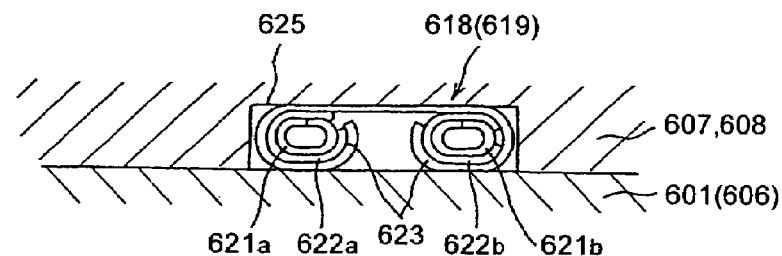

From a viewpoint of effectively inhibiting the metal gasket $20_9$ from sliding while biting into the outer cover $50_9$ and ensuring the sealing performance, in case the metal gasket $20_9$ with the external diameter of about 6 mm to 12 mm is used, a pitch pm of the upper edge $82u_9$ is preferably from 0.1 mm to 2.0 mm, and more preferably, from 0.1 mm to 0.8 mm. From the same viewpoint, in case the metal gasket $20_9$ with the external diameter of about 5 mm to 6 mm is used, the pitch pm is preferably from 0.1 mm to 0.5 mm, and more preferably, from 0.1 mm to 0.2 mm. When the pitch pm is within such a range, the sufficient sealing performance can be ensured while inhibiting the metal gasket 20 from sliding. Moreover, a sufficient number of the upper edges $82u_9$ bite into the sealing area $50s_9$ of the outer cover $50_9$, therefore, the seal dimension increases. In this manner, the tightening load of the metal gasket $20_9$ can be received dispersively, therefore, the creep deformation in the long-term storage can be inhibited. Obviously, the sealing structure described above can be applied to the space between the primary lid 507 (see FIG. 20) and the body 501 (the same is applied hereinafter).

The configuration of the metal gasket 20 according to the first embodiment is especially suited to a case where the outer cover 50 is made of aluminum, tin, or the like, which have a comparatively-low melting point and whose creep deformation becomes a problem at the operating temperature in the radioactive-material container. The configuration may be applied to a case where the outer cover 50 is made of silver, gold, nickel, or the like, which have a comparatively-high melting point and whose creep deformation does not become a problem at the operating temperature in the radioactive-material container, as well. In the latter case, by making the spring coil thin simultaneously, the springback amount becomes 10 times to 20 times as large as the conventional springback amount, therefore, the margin during the transport of the radioactive-material container gets larger than conventional (the same is applied herein after).

FIGS. 11A to 11D are views for illustrating a metal gasket 21 according to a first modification of the first embodiment. The metal gasket 21 and the metal gasket 20 of the radioactive-material container according to the first embodiment have substantially same configuration. However, the difference is that, in the metal gasket 21, two circular coil springs 31 with the different hoop-diameters are arranged concentrically, and the coil springs 31 have the different spring diameters. The other configuration is the same as the configuration in the first embodiment, therefore the explanation is omitted and the same reference symbol is applied to the same component.

Figure 11A:
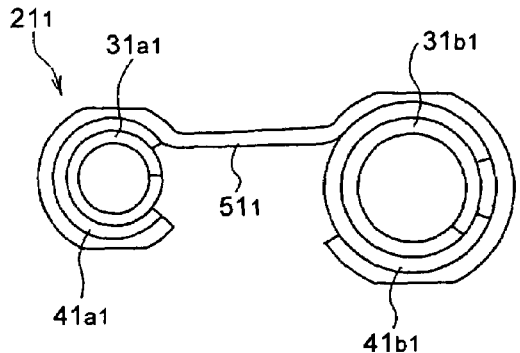
FIGS. 11A to 11D are views for illustrating a metal gasket according to a first modification of the first embodiment.
Figure 11B:
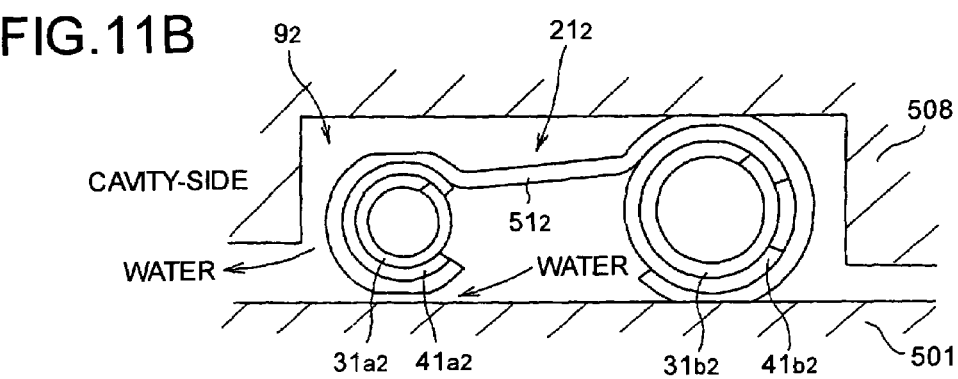

A metal gasket $21_1$, shown in FIG. 11A, is so-called a double-ring type and includes coil springs $31_{a1}$, $31_{b1}$ that have the different diameters and are respectively covered with inner covers $41_{a1}$, $41_{b1}$. As shown in FIG. 11B, when a metal gasket $21_2$ is arranged between the body 501 and the secondary lid 508, some parts, on the side of a coil spring $31_{b2}$, of an outer cover $51_2$ makes a physical contact with the body 501 and the like first, because the coil spring $31_{b2}$ has the larger diameter than a coil spring $31_{a2}$. The secondary lid 508 is fixed to the body 501 temporarily in this state.

Generally, in view of safety, the recycle fuel assembly is contained in the radioactive-material container while the radioactive-material container is sunk in the storage pool filled with water. Therefore, before the transport and the long-term storage, the water is removed by vacuum drying or the other drying means. In the metal gasket $21_2$, water left inside a groove $9_2$ of the metal gasket $21_2$ (hereinafter, a gasket groove $9_2$) evaporates and goes out from the side of the coil spring $31_{a2}$ during the vacuum drying, because the coil spring $31_{a1}$ has the smaller diameter and the sealing is not performed on the side of the coil spring $31_{a2}$. After completing the vacuum drying, the body 501 and the secondary lid 508 are tightened fully. In this manner, in the metal gasket $21_2$, potential for corrosion can be minimized by fully removing the water inside the gasket groove $9_1$ and the metal gasket $21_2$. Consequently, reliability of the sealing performance improves even in the long-term storage.

Figure 11C:
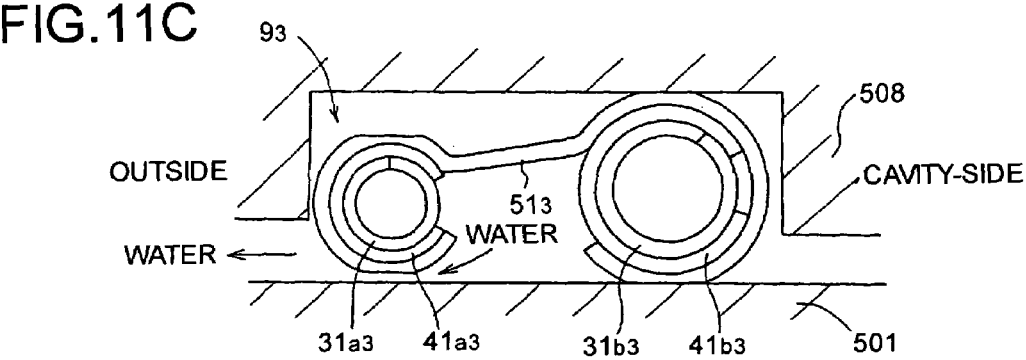

In FIG. 11B, the coil spring $31_{a2}$ with the smaller spring diameter is arranged on the cavity side, and in this case, there is an advantage when the vacuum drying is performed from the cavity side. A coil spring $31_{a3}$ with the smaller spring diameter may be arranged on the outer side as shown in FIG. 11C. In this case, the water can be removed effectively when the vacuum drying is performed from the side of the bolt hole, which fixes the secondary lid 508 or the like.

Figure 11D:
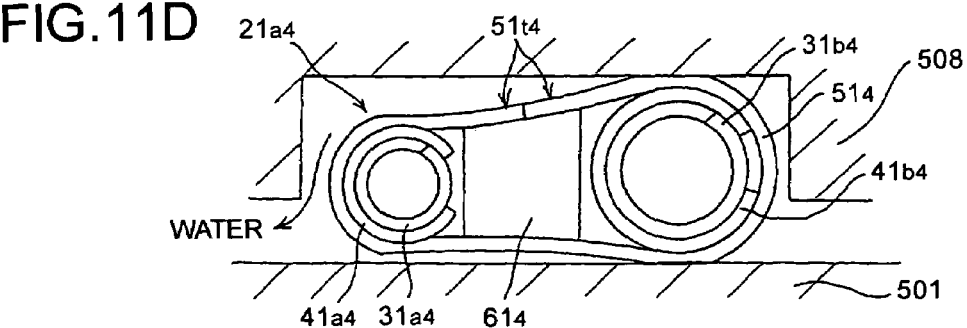

In a metal gasket $21_4$ shown in FIG. 11D, an outer cover $51_4$ covers coil springs $31_{a4}$, $31_{b4}$ wholly, a spacer $61_4$ is arranged between the coil springs $31_{a4}$, $31b4$, and ends $51_{14}$ are sealed by welding or the other means for joining. In the metal gasket $21_4$, the drying described above can be promoted by having the coil springs $31_{a4}$, $31_{b4}$ with the different diameters. Moreover, the metal gasket $21_4$ can stop water from seeping inside. Consequently, compared to the metal gasket $21_1$ shown in FIG. 11A, the drying can be performed faster in the metal gasket $21_4$ as well. The spacer $61_4$ is used to restrain the deformation of the outer cover $51_4$, and a piece of pure aluminum or the like, or a coil spring may be used. The first modification can be applied to the primary lid and the embodiments below.

Figure 12A:
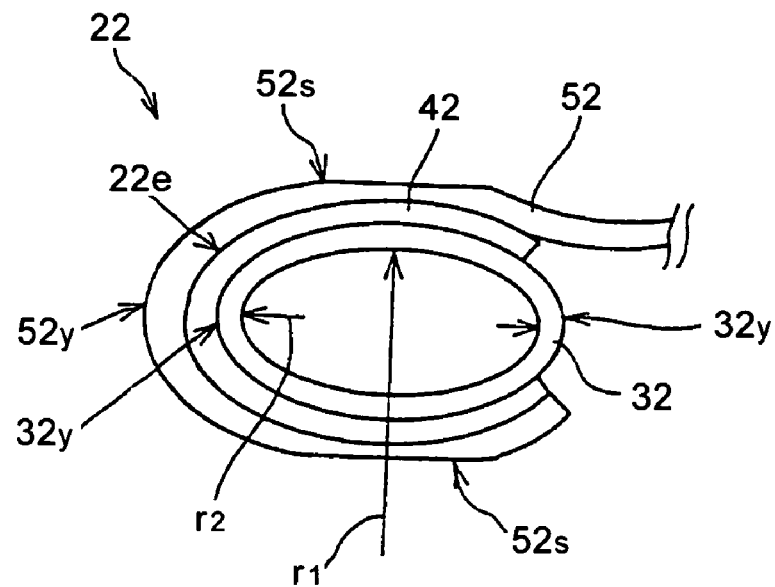
FIGS. 12A and 12B are views for illustrating a metal gasket according to a second modification of the first embodiment.
Figure 12B:
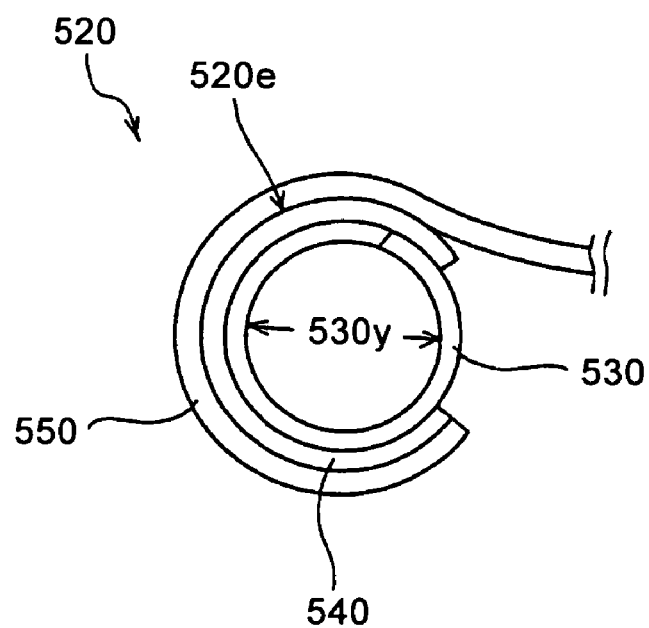

FIG. 12A is a view for illustrating a metal gasket according to a second modification according to the first embodiment. For convenience in the explanation, the metal gasket 520 used in the conventional radioactive-material container is shown in FIG. 12B. A metal gasket 22 has substantially same configuration as the metal gasket 20 according to the first embodiment, however, the difference is that the metal gasket 22 includes a coil spring 32. In the coil spring 32, a curvature diameter $r_1$ at a sealing area 52s is lager than a curvature diameter $r_2$ at an area 52y, which is an area except the sealing area 52s. Another difference is that an internal element, which includes the coil spring 32 and an inner cover 42 covered with an outer cover 52, is formed to have substantially elliptical cross-section in advance. The other configuration is the same as the configuration in the first embodiment, therefore the explanation is omitted and the same reference symbol is applied to the same component.

As shown in FIG. 12B, in the conventional metal gasket 520, an internal element 520e, which includes the inner cover 540 and the coil spring 530 covered with the inner cover 40, has substantially circular cross-section. Therefore, the flexural rigidity of the spring is high, and the sealing performance, which corresponds to dozens of megapascals, is obtained. However, as described above, when the flexural rigidity of the coil spring 530 is high, the springback amount can not be increased compared to when the flexural rigidity is small (see FIG. 5). Moreover, the outer cover 550 has been stressed for the long time of several decades, therefore, the outer cover 550 is burned out, and the restoring force weakens. Consequently, there are potentials of decreasing the sealing performance and decreasing the springback amount.

In the metal gasket 22 according to the second modification, an internal element 22e, which includes the inner cover 42 and the coil spring 32 covered with the inner cover 42, is formed to have substantially elliptical cross-section in advance. Therefore, the flexural rigidity of the spring can be decreased compared to when the cross section is substantially circular. Consequently, the sufficient springback amount can be ensured. Even if the larger gap is produced in the metal gasket 22 than the conventional metal gasket 520, the safer transport can be performed because the air tight of the radioactive-material container can be maintained. Moreover, compared to the conventional metal gasket 520, the coil spring 32 make a contact with a sealing area 52s with the larger dimension, and therefore, the stress that acts on the outer cover 52 can be decreased more than conventional. Consequently, the creep deformation of the outer cover 52 is inhibited, the stress-relaxation phenomenon decreases, and the reliability in the long-term storage improves.

In the metal gasket 22, the flexural rigidity of the coil spring 32 is smaller than conventional, therefore, the sealing pressure is lower than conventional. However, the metal gasket 22 is used to seal the radioactive-material container, and required to have the required sealing performance so that the positive pressure in the radioactive-material container 500 is at most about 1.0 MPa. Consequently, the sufficient sealing performance can be ensured with the sealing pressure of the metal gasket 22.

The configuration of the metal gasket and the configuration of the radioactive-material container, which are explained in the first embodiment and the modifications, can be applied to a second embodiment or later.

FIGS. 13A to 13D are views for illustrating a sealing structure in a radioactive-material container according to the second embodiment of the present invention. A radioactive-material container according to the second embodiment has substantially same configuration as the radioactive-material container according to the first embodiment. However, the difference is the metal gasket used in the radioactive-material container. A metal gasket according to the second embodiment is so-called double-ring type, and in the metal gasket, both ends of an outer cover are joined so as to unify coil springs, which have the different hoop-diameters and are arranged concentrically, while the outer cover covers the coil springs. The other configuration is the same as the configuration in the first embodiment, therefore the explanation is omitted and the same reference symbol is applied to the same component.

In a metal gasket 23, which is so-called double-ring type, two coil springs 33 with the different diameters are arranged concentrically, two inner covers 43 cover the coil springs 33, the outer cover 53 covers the inner covers 43, and ends 53t of the outer cover 53 are jointed at a joint 53b. The ends 53t are jointed by welding or a friction bonding. It is preferable to perform the welding by a laser welding or an electron beam welding, because a caul does not need to be set at the joint 53b.

Figure 13A:
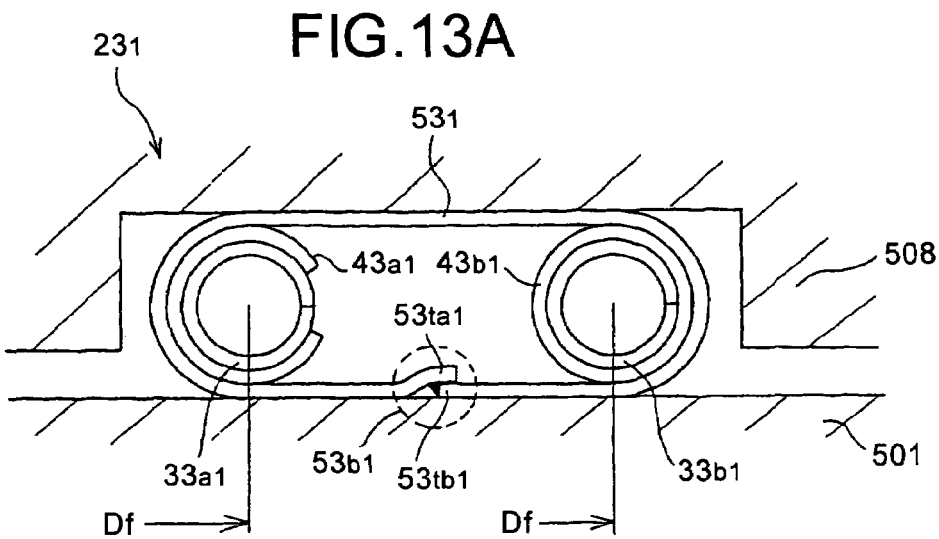
FIGS. 13A to 13D are views for illustrating a sealing structure of a radioactive-material container according to a second embodiment of the present invention.
Figure 13B:
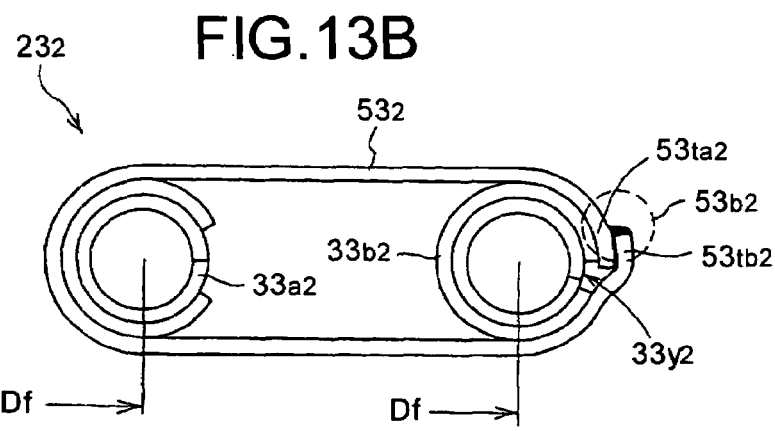
Figure 13C:
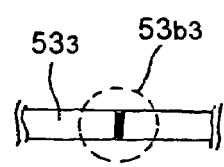
Figure 13D:
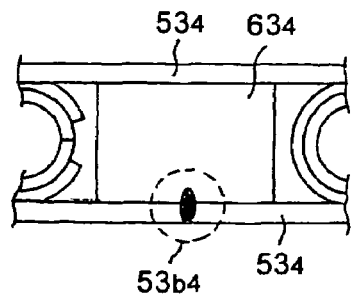

As shown in FIG. 13A, ends $53t_{a1}$, $53t_{b1}$ may be jointed at a joint $53t_1$ arranged between coil springs $33_{a1}$, $33_{b1}$ with the different hoop diameter Df. In FIG. 13C, ends of an outer cover $53_3$ is butted and jointed at a joint $53b_3$. The ends $53t_{a1}$, $53t_{b1}$ may be jointed in a manner shown in FIG. 13C. As shown in FIG. 13B, ends $53t_{a2}$, $53t_{b2}$ may be jointed at a side $33y_2$ of a coil springs $33_{b2}$, or a side of a coil springs $33_{a2}$ (not shown). Moreover, as shown in FIG. 13D, a spacer $63_4$ is arranged inside an outer cover $53_4$, and ends of the outer cover $53_4$ and the spacer $63_4$ may be jointed one another at a joint $53b_4$. Only the ends of the outer cover $53_4$ may be jointed while using the spacer $63_4$ as a backup for the joining. If the spacer $63_4$ is used as a backup for the joining, the ends of the outer cover $53_4$ can be jointed easily. The spacer $63_4$ may be made of pure aluminum or the like.

Moreover, at a space between the coil springs 33 shown in FIG. 13A or FIG. 13B, a spring, which has the slightly smaller external diameter than the coil springs 33, may be arranged to restrain the deformation of the outer cover 53 as alternative to the spacer $63_4$. By using such a spring, the metal gasket 23 can be manufactured more easily in comparison with the case of using pure aluminum or the like. Moreover, using such a spring is preferable because the outer cover 53 is not stressed excessively by adjusting the repulsive force of the coil spring to the proper value.

Figure 14A:
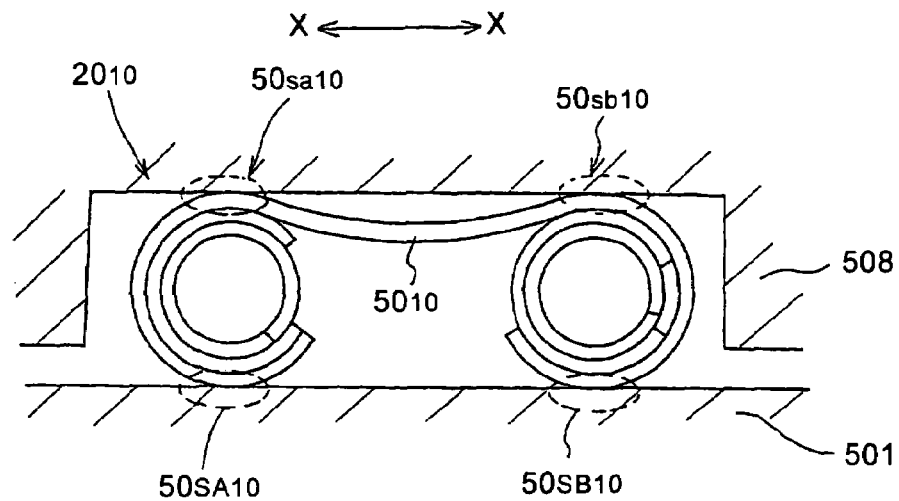
FIGS. 14A to 14C are views for illustrating a metal gasket, which is partially-open and double-ring type, and a metal gasket according to the second embodiment of the present invention.
Figure 14B:
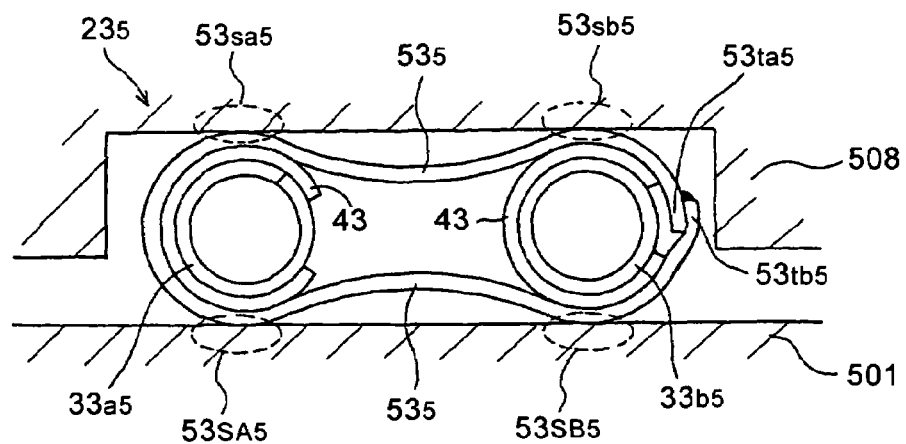
Figure 14C:
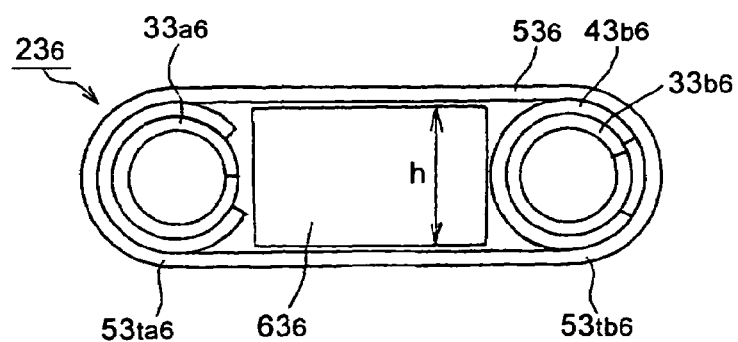

FIGS. 14A to 14C are views for illustrating a metal gasket, which is partially-open and double-ring type, and a metal gasket according to the second embodiment of the present invention. As shown in FIG. 14A, in a metal gasket $20_{10}$, which is partially-open and double-ring type, a sealing area $50s_{a10}$ and a sealing area $50s_{b10}$, which are sealing areas on the secondary lid 508 side, are connected via an outer cover $50_{10}$. Therefore, if the outer cover $50_{10}$ tries to creep to a radial direction X of the metal gasket $20_{10}$, the creep deformation is restrained. In this manner, the creep deformation of the outer cover $50_{10}$ is inhibited on the sides of the sealing areas $50s_{a10}$, $50s_{b10}$, and the stress relaxation of the metal gasket $20_{10}$ is restrained corresponding to the inhibition of the creep deformation.

On the other hand, on the body 501 side, a sealing area $50s_{A10}$ and a sealing area $50s_{B10}$ are not connected via the outer cover $50_{10}$. Therefore, if the outer cover $50_{10}$ tries to creep to a radial direction X of the metal gasket $20_{10}$, nothing restrains the creep deformation. Therefore, compared to the secondary lid 508 side, the outer cover $50_{10}$ creeps more on the body 501 side, and the stress relaxation of the metal gasket $20_{10}$ increases corresponding to the creep deformation.

However, as shown in FIG. 14B, in a metal gasket $23_5$ according to the present invention, coil springs $33_{a5}$, $33_{b5}$ with the different hoop-diameters Df are arranged concentrically and covered with inner covers $43_{a5}$, $43_{b5}$ respectively, the inner covers $43_{a5}$, $43_{b5}$ are covered with an outer cover $53_5$, and ends $53t_{a5}$, $53t_{b5}$ of the outer cover 535 are jointed. Therefore, at any sealing part on the secondary-lid 508 side and on the body 501 side, sealing areas $53s_{a5}$, $53s_{A5}$, $53s_{b5}$, $53s_{B5}$ are connected via the outer cover $53_5$. Accordingly, the creep deformation of the outer cover $53_5$ is restrained at any sealing areas 53s on the secondary-lid 508 side and on the body 501 side, namely the sealing areas $53s_{a5}$, $53s_{A5}$, $53s_{b5}$, $53s_{B5}$. Consequently, the stress-relaxation phenomenon accompanying the creep deformation is inhibited, the sealing performance is maintained even in the long-term storage, and the transport can be performed safely.

Moreover, because the ends $53t_{a5}$, $53t_{b5}$ of the outer cover 535 are jointed by a friction bonding or other means for joining, the air tight can be maintained inside the metal gasket 235. Generally, in view of safety, the recycle fuel assembly is contained in the radioactive-material container while the radioactive-material container is sunk in the storage pool filled with water. Therefore, after the radioactive-material container is pulled out of the pool and the water is removed, the radioactive-material container is dried by vacuum drying or the other drying means. Then, the radioactive-material container is transported and stored for a long period of time. At this time, in the metal gasket 520 (see FIG. 7A), which is partially-open and double-ring type, it takes a long time to completely remove the water seeping inside by the vacuum drying because the insufficient drying may cause a corrosion. However, in the metal gasket 235, the water does not seep inside, therefore, time for the vacuum drying can be reduced significantly, there disappears the potential of the corrosion caused by the water left inside, and the higher reliability can be obtained in the long-term storage.

As shown in FIG. 14C, ends $53t_{a6}$, $53t_{b6}$ of an outer cover $53_6$ may be jointed after arranging a spacer $63_6$ between coil springs $33_{a6}$, $33_{b6}$, which are arranged concentrically, covered with inner covers $43_{a6}$, $43_{b6}$ respectively, and have the different hoop-diameters. In this manner, the outer cover $53_6$ can be supported by the spacer $63_6$, therefore, the deformation of the outer cover $53_6$ can be inhibited, and the ends $53t_{a6}$, $53t_{b6}$ can be jointed easily.

As shown in FIG. 14C, to inhibit the deformation of the outer cover $53_6$ when the tightening load is applied on the outer cover $53_6$, the spacer $63_6$ may be formed to have a height h as high as the diameter of the inner cover $43_6$. In this manner, the deformation of the outer cover $53_6$ can be inhibited when the outer cover $53_6$ is tightened, therefore, the creep deformation of the outer cover $53_6$ can be inhibited more, and the reliability in the long-term storage increases. The spacer $63_6$ may have a shape so as to be easily deformed by the tightening stress of the metal gasket $23_6$ without a needlessly high tightening-stress. As described above, instead of using the spacer $63_6$, a spring that has the slightly smaller diameter than the coil spring 33 may be used.

In the same way as the first embodiment, the sealing areas 53s of the metal gasket 23 may be formed to have a flat surface, and a step may be formed along the circumferential direction of the metal gasket 23 at the intersection of the sealing area and an area except the sealing area. In this manner, the stress concentration at the sealing areas 53s can be uniformed more, therefore, the creep deformation at the sealing areas 53s can be inhibited more. Consequently, the higher reliability can be obtained in the long-term storage.

The second embodiment according to the present invention hereto has been explained. The configuration of the metal gasket and the configuration of the radioactive-material container, which are explained in the second embodiment, can be applied to a third embodiment or later.

Figure 15A:
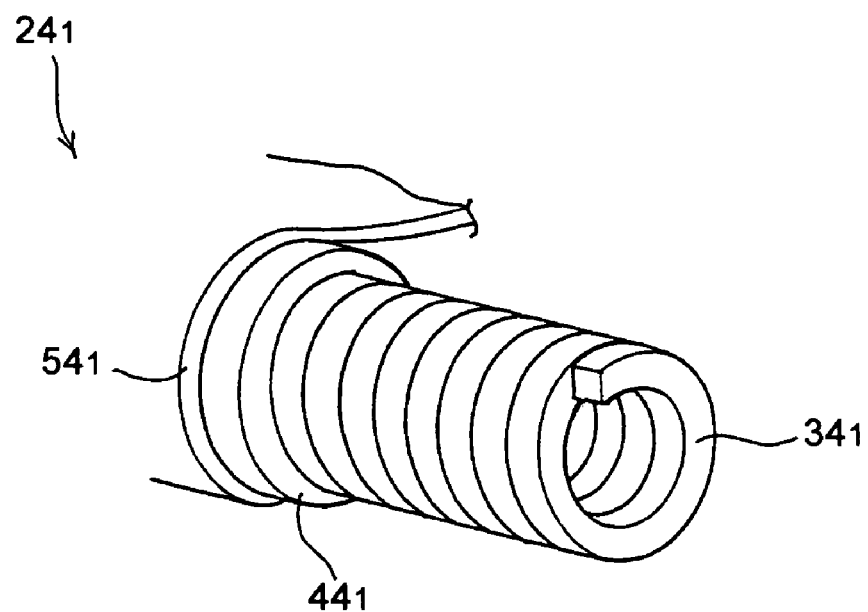
FIGS. 15A and 15B are views for illustrating a coil spring according to a third embodiment of the present invention.
Figure 15B:
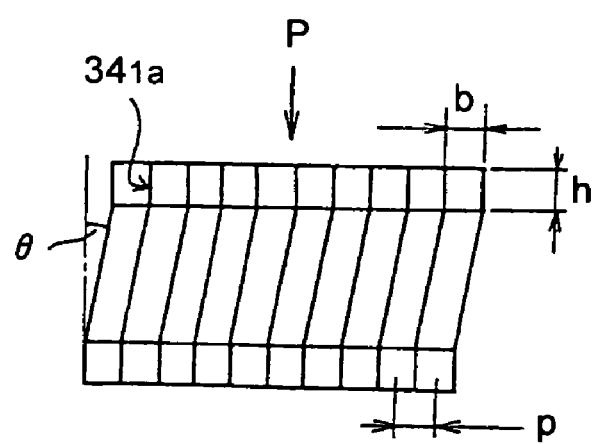

FIGS. 15A and 15B are views for illustrating a spring of a metal gasket according to the third embodiment of the present invention. A radioactive-material container according to the third embodiment and the radioactive-material container according to the first embodiment have substantially same configuration. However, the difference is that the metal gasket according to the third embodiment uses a coil spring that has a wire rod with substantially rectangular cross-section. The other configuration is the same as the configuration in the first embodiment, therefore the explanation is omitted and the same reference symbol is applied to the same component.

As shown in FIG. 15A, a coil spring $34_1$ used in a metal gasket $24_1$ has a wire rod with a rectangular cross-section. Therefore, the coil spring $34_1$ makes a contact with an inner cover $44_1$ with the lager dimension in comparison with a coil spring with a circular cross-section, and a repulsive force of the coil spring $34_1$ can be transmitted to the inner cover $44_1$ and an outer cover $54_1$ more uniformly. Consequently, the stress distribution of the outer cover $54_1$ can be more uniformed, so that the inner cover $44_1$, which contains a reaction force of the coil spring $34_1$, may be removed or may have the thinner thickness, and moreover, the stress-relaxation phenomenon, ascribable to the creep deformation, of the metal gasket $24_1$ can be decreased. Therefore, the sealing performance can be maintained even in the long-term storage.

If the coil spring with a circular cross-section and the coil spring $34_1$ with a rectangular cross-section have the same section modulus, the coil spring $34_1$ has the thinner width b of the wire rod, and a pitch p can be smaller. Therefore, if the coil spring with a circular cross-section and the coil spring $34_1$ have the same flexural rigidity, the winding number of the coil spring $34_1$ can be increased, and the repulsive force of the coil spring $34_1$ can be transmitted to the outer cover $54_1$ more uniformly. As just described, when the coil spring $34_1$ with a rectangular cross-section is used, the stress-relaxation phenomenon can be inhibited more in the metal gasket $24_1$ than the coil spring with substantially circular cross-section. Moreover, the pitch p can be decreased, therefore, the coil spring $34_1$ can have the smaller initial gradient $\theta_{p=0}$, which is a gradient when the tightening stress does not act, than the coil spring with a circular cross-section. Consequently, the repulsive force of the coil spring $34_1$ can be used more effectively.

If the coil spring with a circular cross-section and the coil spring $34_1$ with a rectangular cross-section have the same section modulus, the stress, which is caused in the coil spring by the tightening stress of the metal gasket, can be decreased more in the coil spring $34_1$. Moreover, unlike the coil spring with a circular cross-section, the adjacent wire rods make a contact with each other via a surface $34a_1$ in the coil spring $34_1$. In this manner, the stress that the tightening stress P produces on the surface $34a_1$ can be decreased more than in the coil spring with a circular cross-section. Consequently, a gradient Op, which is made by the tightening stress P, can be decreased more than in the coil spring with a circular cross-section, and the torsion stress, which acts on the wire rod of the coil spring $34_1$, can be decreased. When the coil spring $34_1$ with a rectangular cross-section is used, these actions provide the higher-and-longterm reliability of the coil spring $34_1$.

The third embodiment according to the present invention hereto has been explained. The configuration of the metal gasket and the configuration of the radioactive-material container, which are explained in the second embodiment, can be applied to a fourth embodiment or later.

FIGS. 16A to 16D are partial cross-sections for illustrating a sealing structure of a radioactive-material container according to the fourth embodiment. The sealing structure of the radioactive-material container according to the fourth embodiment is characterized in that a metal gasket is made to be waterproof. Generally, in view of safety, the recycle fuel assembly is contained in the radioactive-material container while the radioactive-material container is sunk in the storage pool filled with water. Therefore, before the transport and the long-term storage, the water is removed by vacuum drying or the other drying means. In the partially-open-and-double-ring-type metal gasket and the single-ring-type metal gasket, the water that seeps inside could not be removed completely, or it takes a long time to perform the vacuum drying. The incomplete drying may cause the corrosion of the metal gasket.

Figure 16A:
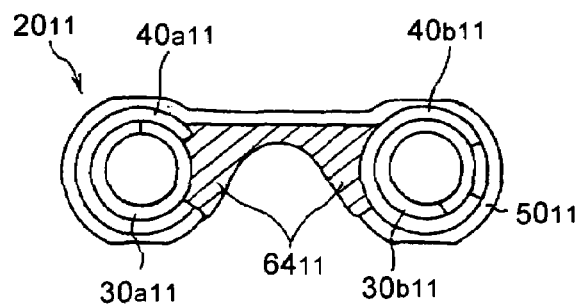
FIGS. 16A to 16D are partial cross-sections for illustrating a sealing structure of a radioactive-material container according to a fourth embodiment.
Figure 16B:
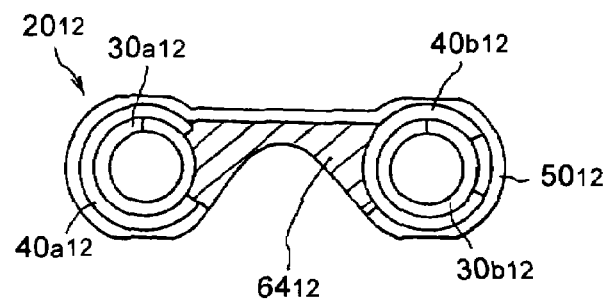

In FIG. 16A, as a waterproofing, a sealing agent $64_{11}$ is used to fill in an interspace inside an outer cover $50_{11}$ of a metal gasket $20_{11}$. This waterproofing prevents the water from seeping inside the metal gasket $20_{11}$ while containing the recycle fuel assembly. Moreover, arranging the drying agent inside coil springs $30a_{11}$, $30b_{11}$ is effective in keeping the inside of the coil springs $30a_{11}$, $30b_{11}$ dry. As shown in FIG. 16B, in a metal gasket $20_{12}$, which is double-ring type, a sealing agent $64_{12}$ may be used to fill in a space formed between two rings of the metal gasket $20_{12}$. In this manner, even if the metal gasket $20_{12}$ is tightened and deformed, a resin follows the deformation easily. Therefore, this manner increases the waterproofing property, and is preferable. Such a water proofing stops the water from seeping inside the metal gasket $20_{12}$, the corrosion of the metal gasket $20_{12}$ is not caused by the water. Consequently, the high sealing performance can be maintained even in the long-term storage. As the sealing agent 64, a silicone-rubber sealing agent is preferable because of waterproofing property, durability, and property of following a deformation. An example of the sealing agent 64 is "KE103" from Shin-Etsu Chemical Co., Ltd.

Figure 16C:
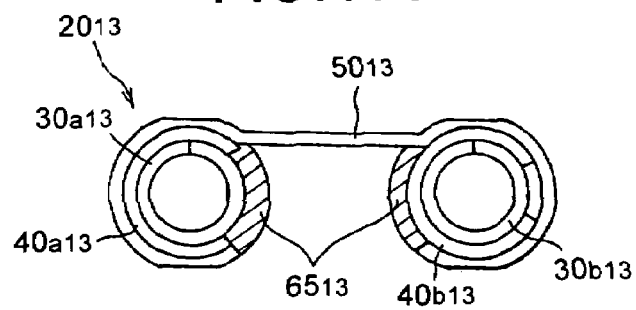

As shown in FIG. 16C, a water-repellent agent $65_{13}$ may be applied to an interspace inside an outer cover $50_{13}$ of a metal gasket $20_{13}$. A part where the water-repellent agent $65_{13}$ is applied repels water, therefore, the water is easily removed by vacuum drying. Using both the sealing agent 64 and the water-repellent agent 65 provides the higher effect of waterproof. The water-repellent finishing may be performed on the metal gasket 2013 entirely, and such manner is preferable because the water can be removed more easily. Examples of the water-repellent agent 65 are a silicone water-repellent-agent, a fluorine water-repellent-agent, and a silane-coupling water-repellent-agent.

Moreover, as a surfactant, before the sealing, alcohol such as ethanol, methanol, and isopropyl alcohol, or the other organic agents may be used to fill in a metal gasket $20_{14}$, or may be applied sufficiently. These organic agents prevent the water from seeping inside the metal gasket $20_{12}$ while the process of containing the recycle fuel assembly is performed under the water. These organic agents have a low melting-point, and completely evaporate in the vacuum drying, therefore, the water does not remain inside the metal gasket $20_{14}$. This manner also enables removing the water that remains, therefore, the corrosion of the metal gasket $20_{14}$ can be inhibited even in the long-term storage, and the reliability of the storage increases.

Figure 16D:
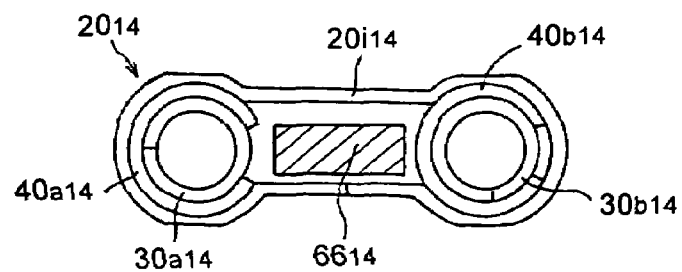

As shown in FIG. 16D, the drying of the internal space may be promoted by arranging a drying agent $66_{14}$ in an enclosed space $20i_{14}$ of a metal gasket $20_{14}$. This manner enables drying the water that enters into the metal gasket $20_{14}$ accidentally, therefore, the corrosion of the metal gasket $20_{14}$ can be inhibited even in the long-term storage, and the reliability of the storage increases. Examples of the drying agent 66 are a silicon-dioxide drying-agent, a clay drying-agent, which are a physical absorption type, and a quicklime drying-agent, which is a chemical absorption type.

On the surface of the outer cover 50 of the metal gasket 20, a metal film, an oxide film, and other anti-corrosive agent may be formed. In this manner, the anti-corrosive agent inhibits the corrosion of the outer cover 50 even if the water remains, and therefore, the reliability of the sealing performance in the long-term storage increases. The anti-corrosive film may be formed not only on the outer cover 50 but also the entire of the metal gasket 20. In this manner, the inner cover 40 and the coil spring 30 are protected from the corrosion as well.

The anti-corrosive film is formed by a wet process like an alumite treatment, or by a method of evaporating a metal with a high corrosion-resistance, such as Ti, Cr, and Ag, to the outer cover 50 and the metal gasket 20 using an ion-plating method. Especially, an ion-plating method is preferable, because the anti-corrosive film can be formed after the outer cover 50 covers the inner cover 40 so as to form the metal gasket 20, and there is flexibility in the formation.

Figure 17A:
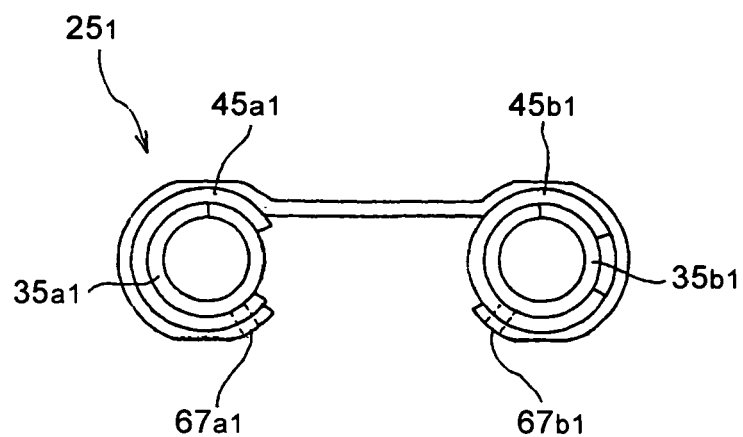
FIGS. 17A to 17C are views for illustrating a metal gasket according to a first modification of the fourth embodiment.
Figure 17B:
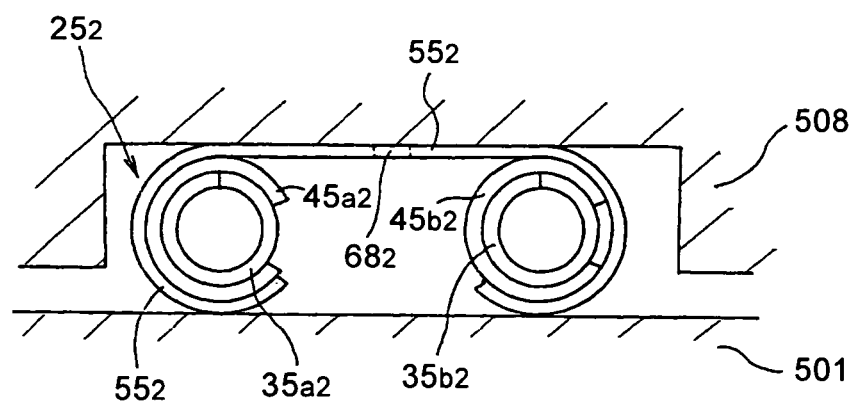
Figure 17C:
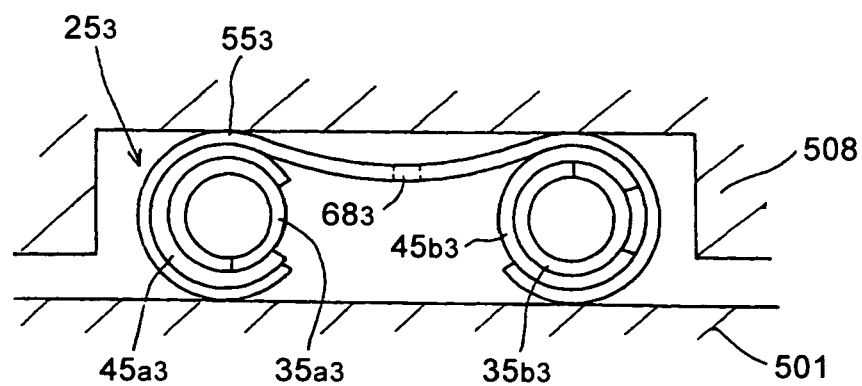

FIGS. 17A to 17C are views for illustrating metal gaskets according to a first modification of the fourth embodiment. The metal gaskets are characterized in that including a hole for draining water (hereinafter, a water-draining hole). In a modification shown in FIG. 17A, water-draining holes $67_{a1}$, $67_{b1}$ are respectively arranged in coil spring $35_{a1}$, $35_{b1}$, and used to remove the water, which enters into the coil springs $35_{a1}$, $35_{b1}$, in the vacuum drying. In a modification shown in FIG. 17B, a water-draining hole $68_2$ is arranged in an outer cover $55_2$ and between coil springs $35_{a2}$, $35_{b2}$. The water-draining hole $68_2$ enables removing the water that remains between the secondary lid 508 and the outer cover $55_2$ of a metal gasket $25_2$. As shown in FIG. 17C, a water-draining hole $68_3$ is arranged in an outer cover $55_3$ and between coil springs $35_{a3}$, $35_{b3}$, and moreover, the outer cover $55_3$ may be curved so as to arrange an interspace between the outer cover $55_3$ and the secondary lid 508. In this manner, the interspace between the outer cover $55_3$ and the secondary lid 508 becomes larger, therefore, the effect of the surface tension of water decreases, and the drainage performance increases. Where and how many the water-draining holes 67, 68 are arranged may be changed properly based on the specification of the metal gasket 25. In the metal gaskets 25, the water that remains inside the metal gaskets 25 is easily removed from the water-draining holes 67, 68 in the vacuum drying, therefore, the drying can be performed more easily, and the corrosion of the metal gaskets 25 can be inhibited even in the long-term storage.

Figure 18A:
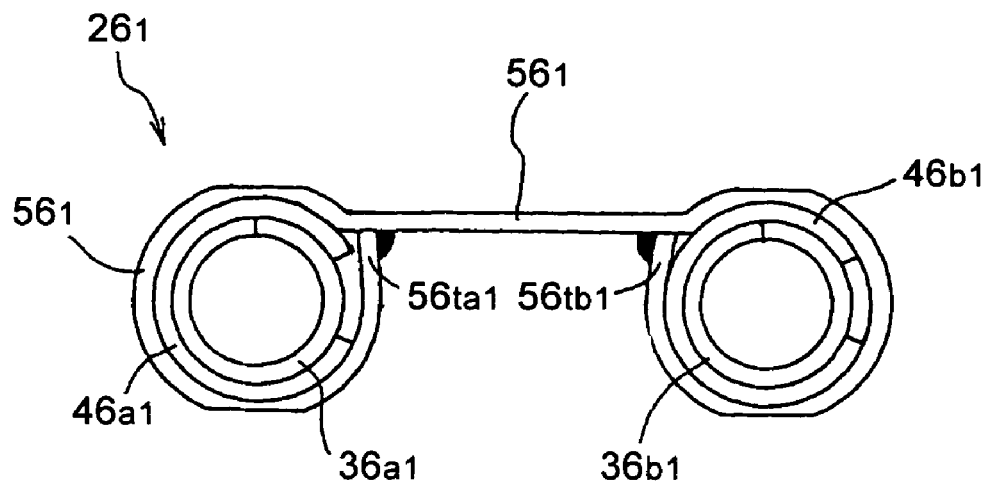
FIGS. 18A and 18B are views for illustrating a metal gasket according to a second modification of the fourth embodiment.
Figure 18B:
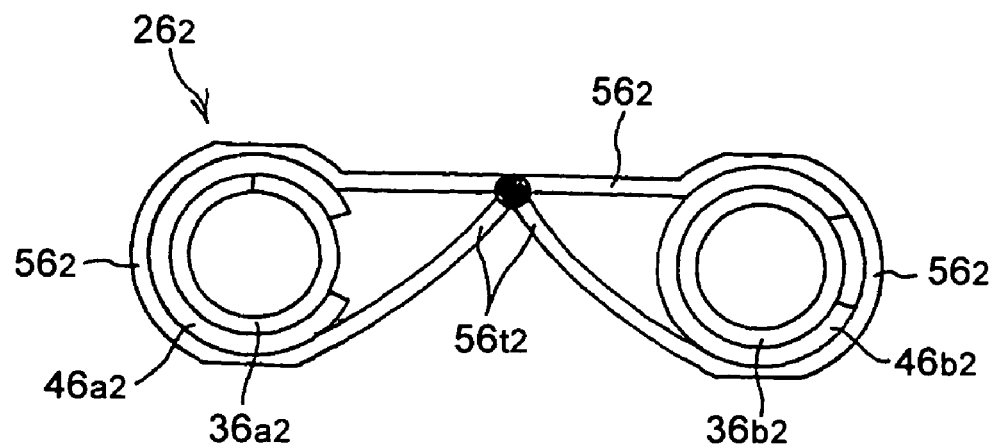

FIGS. 18A and 18B are views for illustrating metal gaskets according to a second modification of the fourth embodiment. A metal gasket $26_1$, shown in FIG. 18A, is characterized in that an outer cover $56_1$ covers two internal elements and ends $56t_{a1}$, $56t_{b1}$ of the outer cover $56_1$ are jointed with the outer cover $56_1$. One internal element includes an inner cover $46_{a1}$ and a coil spring $36_{a1}$ covered with the inner cover $46_{a1}$ while another internal element includes an inner cover $46_{b1}$ and a coil spring $36_{b1}$ covered with the inner cover $46_{b1}$. In this manner, the internal elements are sealed at each joint, and the water does not seep inside the metal gasket $26_1$. Therefore, the water does not cause the corrosion of the metal gasket $26_1$, and the high sealing-performance can be maintained even in the long-term storage. The ends $56t_{a1}$, $56t_{b1}$ and the outer cover $56_1$ may be jointed using means for welding such as a laser welding and an electron beam welding. If ends $56t_{a2}$, $56t_{b2}$ of an outer cover $56_2$ and the outer cover $56_2$ are jointed at one joint as shown in FIG. 18B, only the process for one joint is required, and the efficiency of the process improves. The fourth embodiment and the modifications can be applied to the conventional metal gasket 520 (see FIG. 7A).

Figure 22:
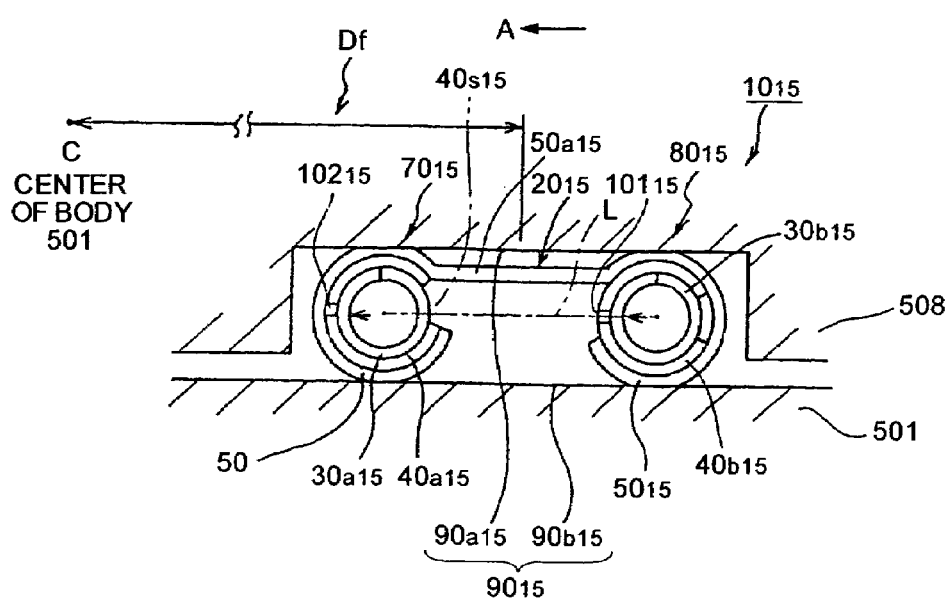
FIG. 22 is a schematic for illustrating a sealing structure of a radioactive-material container according to a fifth embodiment of the present invention.
Figure 23A:
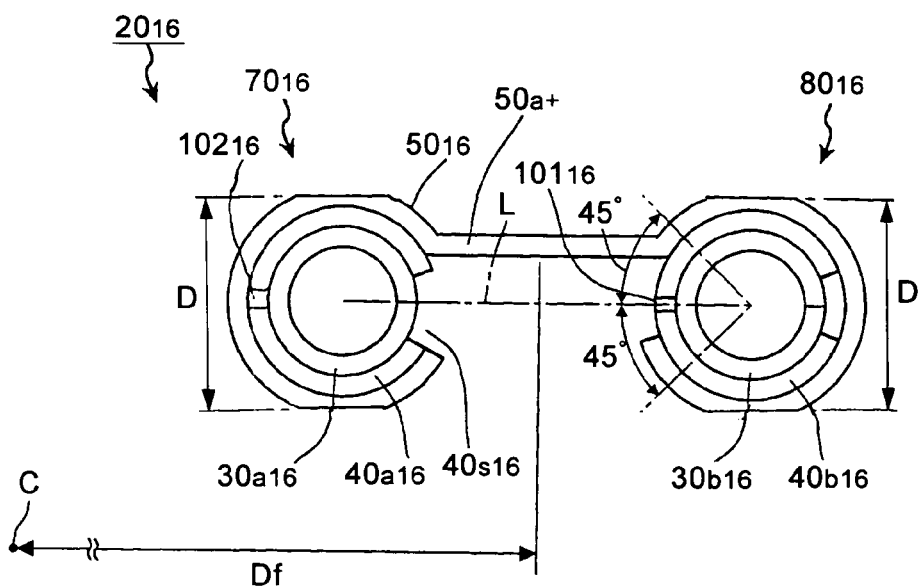
FIGS. 23A and 23B are cross sections of a metal gasket according to the fifth embodiment of the present invention.
Figure 23B:
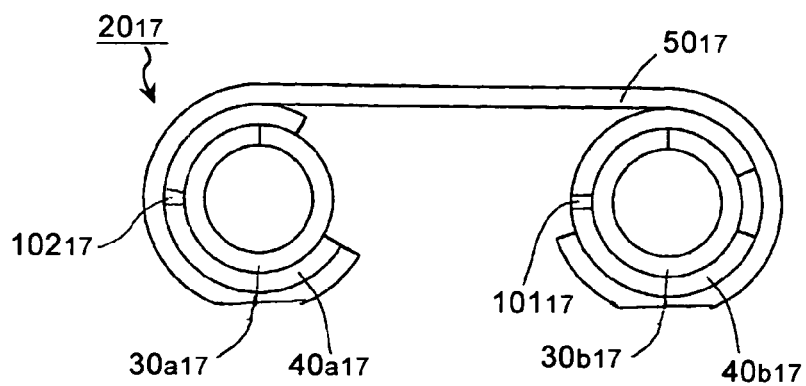

FIG. 22 is a view for illustrating a sealing structure in a radioactive-material container according to a fifth embodiment of the present invention. FIGS. 23A and 23B are cross sections of metal gaskets according to the fifth embodiment of the present invention. A metal gasket $20_{15}$ in a sealing structure $10_{15}$ of the radioactive-material container according to the fifth embodiment is characterized in that a first water-draining hole $101_{15}$ is arranged in an inner cover $40_{b15}$ and a second water-draining hole $102_{15}$ is arranged in an inner cover $40_{a15}$. In the metal gasket $20_{15}$, which is so-called a double-ring type, coil springs $30_{a15}$, $30_{b15}$ with the different hoop-diameters Df are arranged concentrically, and covered with an outer cover $50_{15}$. However, a metal gasket to which the present invention can be applied is not limited to a double-ring type metal gasket but may be applied to a metal gasket $20_{17}$, shown in FIG. 23B, that includes an outer cover $50_{17}$ with a flat upper part, and the single-ring type metal gasket $20_3$ shown in FIG. 2B.

As shown in FIG. 22, the sealing structure $10_{15}$ is arranged between the secondary lid 508 and the flange member 506 of the body 501. Needless to say, the sealing structure and the metal gasket, which are according to the present invention, can be applied to the space between the primary lid 507 and the body 501 (the same is applied hereinafter). As shown in FIG. 23A, in a metal gasket $20_{16}$, inner covers $40_{a16}$, $40_{b16}$ respectively covers coil springs $30_{a16}$, $30_{b16}$ so as to form an inner ring $70_{16}$ and an outer ring $80_{16}$, and an outer cover $50_{16}$ covers the inner ring $70_{16}$ and the outer ring $80_{16}$.

A first water-draining hole $101_{16}$ is arranged in the inner cover $40_{b16}$ so as to face the center C of the body 501, and where the first water-draining hole $101_{16}$ is arranged is not covered with the outer cover $50_{16}$. A second water-draining hole $102_{16}$ is arranged in the inner cover $40_{a16}$ so as to face the center C of the body 501.

Where the first water-draining hole $101_{16}$ is arranged in the inner cover $40_{b16}$ is not covered with the outer cover $50_{16}$, because it requires arranging the first water-draining hole $101_{16}$ only in the inner cover $40_{b16}$. After the first water-draining hole $101_{16}$ is arranged in the inner cover $40_{b16}$, the inner cover $40_{b16}$ is formed to be circular so as to wind and cover the coil spring $30_{b16}$. Similarly, after the second water-draining hole $102_{16}$ is arranged in the inner cover $40_{a16}$, the inner cover $40_{a16}$ is formed to be circular so as to wind and cover the coil spring $30_{a16}$.

Functions of the first water-draining hole 101 and the second water-draining hole 102 will be explained with reference to FIG. 23A (the same is applied to the metal gasket $20_{15}$, shown in FIG. 22, and the metal gasket $20_{17}$, shown in FIG. 23B). A recycle fuel assembly is contained in the radioactive-material container 500 while the radioactive-material container 500 is sunk in the pool, and after the radioactive-material container 500 is pulled out from the pool, the water is removed from the radioactive-material container 500 by vacuum drying. When the radioactive-material container 500 is sunk in the pool, the water seeps inside the coil spring $30_{a16}$. Especially, when the inner cover $40_{a16}$ has an opening $40s_{16}$ that faces the inside of the metal gasket $20_{16}$, the water seeps inside the coil spring $30_{a16}$ easily. Like in the outer ring $80_{16}$, even if the inner cover $40_{b16}$ does not have an opening, the water seeps through a gap between the outer cover $50_{16}$ and the inner cover $40_{b16}$ and collects inside the $30_{b16}$.

When the water is removed from the radioactive-material container 500, the water that seeps inside the coil spring $30_{b16}$ goes outside from the first water-draining hole $101_{16}$, and the water that seeps inside the coil spring $30_{a16}$ goes outside from the opening $40s_{16}$ of the inner cover $40_{a16}$. At this time, the water that remains between the inner cover $40_{a16}$ and the outer cover $50_{16}$ moves to the inside of the coil spring $30_{a16}$ through the second water-draining hole $102_{16}$ and goes out to an interspace between the inner ring $70_{16}$ and the outer ring $80_{16}$ through the $40s_{16}$. It is not required to arrange a water-draining hole on the opening $40s_{16}$ side of the inner cover $40_{a16}$. However, for example, in case that the opening $40s_{16}$ is arranged close to a bridge $50_{a16}$ of the outer cover $50_{16}$ and the water easily remains owing to the shape, it is preferable to arrange a water-draining hole on the opening $40s_{16}$ side of the inner cover $40_{a16}$.

In manufacturing the metal gasket $20_{16}$, the first water-draining hole $101_{16}$ and the second water-draining hole $102_{16}$ should be carefully made without damaging the coil springs $30_{b16}$, $30_{a16}$. Therefore, the first water-draining hole $101_{16}$ and the second water-draining hole $102_{16}$ are made in the inner covers $40_{b16}$, $40_{a16}$ respectively, and then, the inner covers $40_{b16}$, $40_{a16}$ are respectively wound around the coil springs $30_{b16}$, $30_{a16}$. In this manner, the first water-draining hole $101_{16}$ and the second water-draining hole $102_{16}$ can be easily made in the inner covers $40_{b16}$, $40_{a16}$ respectively without damaging the coil springs $30_{b16}$, $30_{a16}$.

In the embodiment above described, the first water-draining hole $101_{16}$ of the inner cover $40_{b16}$ is arranged so as to face the center C of the body 501 (that is, the first water-draining hole 101 is arranged along a line L, which connects the center of the outer ring $80_{16}$ and the center of the inner ring $70_{16}$), because it is hard to remove the water through the first water-draining hole $101_{16}$ if the first water-draining hole $101_{16}$ faces obliquely downward and is covered with the sealing surface. Preferably, the first water-draining hole $101_{16}$ is arranged so as to face the center C of the body 501 and within a range of +45 degrees against the line L.

Figure 24A:
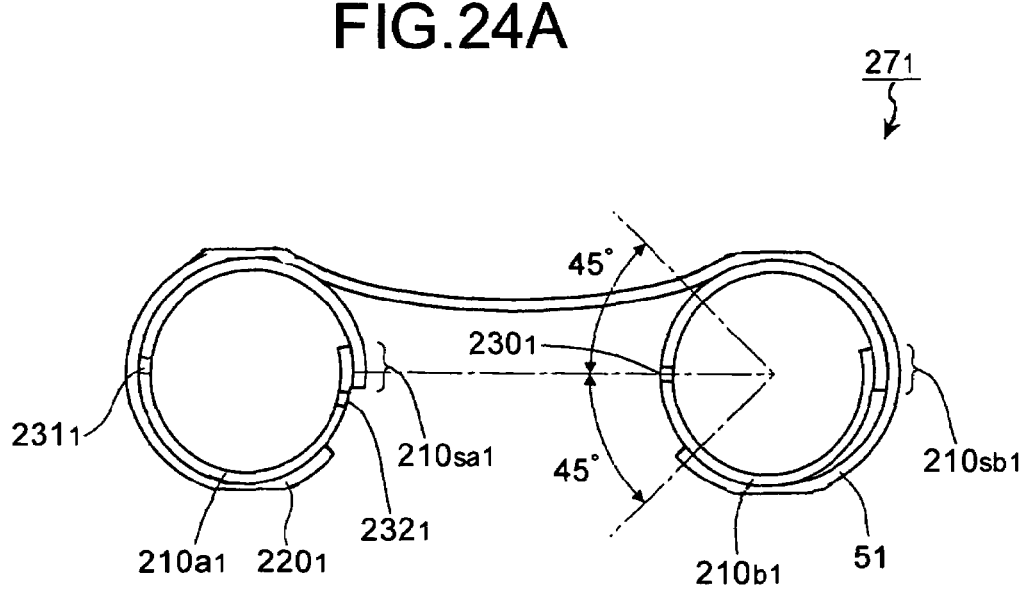
FIGS. 24A and 24B are cross sections of a metal gasket according to a sixth embodiment of the present invention.
Figure 24B:
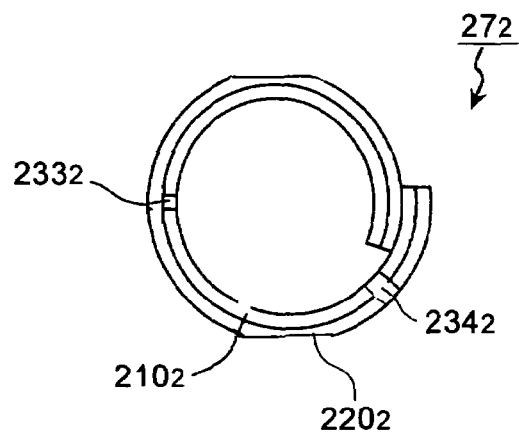

FIGS. 24A and 24B are cross sections of metal gaskets according to a sixth embodiment of the present invention. As shown in FIG. 24A, in a metal gasket $27_1$, inner covers $210_{a1}$, $210_{b1}$ are formed to be circular and the inner covers $210_{a1}$, $210_{b1}$ with the different hoop-diameters are arranged concentrically. An outer cover $220_1$ covers the inner covers $210_{a1}$, $210_{b1}$ so as to have a double-ring shape entirely. The present invention is not limited to the double-ring-type metal-gasket like the metal gasket $27_1$, but may be applied to the so-called single-ring-type metal-gasket like a metal gasket $27_2$ shown in FIG. 24B. In the metal gasket $27_2$, an inner cover $210_2$ is covered with an outer cover $220_2$.

A material of the outer covers 220 is the same as explained in the first embodiment. In the sixth embodiment, the inner covers 210 function as a spring, therefore, the inner covers 210 are made of a material that is same as the material of the coil spring explained in the first embodiment. The inner covers $210_{a1}$, $210_{b1}$ of the metal gasket $27_1$ are formed to be circular while overlapping ends of the inner cover $210_{a1}$ and overlapping ends of the inner cover $210_{b1}$. When a compression is caused by the sealing, overlaps $210s_{a1}$, $210s_{b1}$ slide and the diameters of the inner covers $210_{a1}$, $210_{b1}$ get smaller as a whole. The diameters of the inner covers $210_{a1}$, $210_{b1}$ get smaller, but the contact surfaces with the inner covers $210_{a1}$, $210_{b1}$ do not get larger. Therefore, the sealing can be performed surely.

A lot of first water-draining holes $230_1$ are made in the inner cover $210_{b1}$. In the inner covers $210_{a1}$, a lot of second water-draining holes $231_1$ and third water-draining holes $232_1$ are made along a circumferential direction. The water-draining holes $230_1$, $231_1$, $232_1$ are used to let out the water that seeps inside the inner covers $210_{a1}$, $210_{b1}$. The first water-draining holes $230_1$ is arranged at substantially middle height of the inner cover $210_{b1}$, and so as to face the center C of the body 501. The reason is if, for example, the first water-draining hole $230_1$ is arranged downward and interferes with the outer cover $220_1$, another water-draining hole needs to be made in the outer cover $220_1$.

Moreover, if the first water-draining hole $230_1$ is arranged near the sealing surface, the water easily seeps between the outer cover $220_1$ and the sealing surface, and it is hard to remove the water. Preferably, the first water-draining hole $230_1$ is arranged within a range of ±45 degrees against the line L, which indicates the direction to face the center C of the body 501. On the other hand, in the inner cover $210_{a1}$, the overlap $210s_{a1}$ is arranged inside the metal gasket $27_1$, therefore, the third water-draining hole $232_1$ needs to be arranged so that the third water-draining hole $232_1$ is not covered when the sealing causes the compression and the overlap $210s_{a1}$ slides. Moreover, to decrease the water that remains between the inner cover $210_{a1}$ and the outer cover $220_{a1}$ as much as possible, preferably, the second water-draining hole $231_1$ is arranged in the inner cover $210_{a1}$ at substantially middle height of the inner cover $210_{a1}$ so as to faces the center C of body 501.

The metal gasket $27_2$, shown in FIG. 24B, is formed to be circular after building up the plate-shaped inner cover $210_2$ on the plate-shaped outer cover $220_2$. Then, a first water-draining hole $233_2$ is made at substantially middle height of the inner cover $210_2$. In this case, the inner cover $210_2$ is not exposed to the outside, therefore, a second water-draining hole $234_2$ is made so as to penetrate the inner cover $210_2$ and the outer cover $210_2$. The water that remains between the outer cover $220_2$ and the inner cover $210_2$ is moved to the inside of the inner cover $210_2$ through the first water-draining hole $233_2$, and removed to the outside of the metal gasket $27_2$ through the second water-draining hole $234_2$.

As explained in the above, according to the present invention, at lease any one of the followings can be achieved: ensuring the sufficient sealing performance even in the long-term usage by minimizing the deterioration of the metal gasket, exerting the sufficient sealing performance for the whole period of the long-term storage by surely removing the water inside the metal gasket in the vacuum drying; and reducing the time for the vacuum drying.

Moreover, according to the present invention, the sufficient sealing performance can be exerted for a long period of time by removing the water inside the metal gasket.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radioactive-material container comprising:
   a container body configured to shield nuclear radiation, the container body including a cavity configured to store a basket containing a recycle fuel assembly;
   a lid configured to cover the cavity; and
   a double-ring metal gasket including:
      a pair of coil springs made of a metal in circular shape, each coil spring having different hoop-diameters which are distances from a center of the container body;
      a pair of inner covers made of a metal configured to cover the coil springs in circular shape;
      a pair of outer covers made of a metal, which is softer than a material forming the container body and lid, configured to cover the inner covers in circular shape, the outer covers having areas configured to seal the nuclear radiation, wherein the areas make a physical contact with the container body and the lid, wherein
   the areas have a top and a bottom opposing one another, said top and bottom have flat surfaces, wherein said areas have no intentional projecting parts before being sealed and during being sealed between said container body and said lid, said areas are configured to disperse tightening stress acting on the metal gasket when sealed between said container body and said lid, wherein
   a ratio of a wire diameter d of the coil spring to a sectional diameter D of the metal gasket, d/D, is approximately equal to or more than 0.02 and equal to or less than 0.08, wherein
   d is approximately equal to or more than 0.35 millimeter and equal to or less than 0.8 millimeter, and
   D is approximately equal to or more than 5.0 millimeters and equal to or less than 12.0 millimeters.

2. The radioactive-material container according to claim 1, wherein
   the metal forming the outer cover has a higher corrosion potential than a material forming the container body and the lid.

* * * * *